US00RE40411E

(19) United States
(12) Reissued Patent
Cooper

(10) Patent Number: US RE40,411 E
(45) Date of Reissued Patent: Jul. 1, 2008

(54) SYNCHRONIZING SIGNAL SEPARATING APPARATUS AND METHOD

(76) Inventor: J. Carl Cooper, P.O. Box 4860, Incline Village, NV (US) 89450

(21) Appl. No.: 10/857,340

(22) Filed: Jun. 1, 2004

Related U.S. Patent Documents

Reissue of:
(64) Patent No.: 5,754,250
Issued: May 19, 1998
Appl. No.: 08/566,484
Filed: Dec. 4, 1995

U.S. Applications:
(63) Continuation-in-part of application No. 08/493,661, filed on Jun. 22, 1995, now abandoned, which is a continuation-in-part of application No. 08/165,688, filed on Dec. 13, 1993, now Pat. No. 5,486,869, which is a continuation of application No. 07/837,323, filed on Feb. 18, 1992, now abandoned.

(51) Int. Cl.
*H04N 5/08* (2006.01)
*H04N 5/10* (2006.01)

(52) U.S. Cl. ..... 348/525; 348/521; 348/524; 348/529; 348/530; 348/531; 348/E5.017; 375/113; 307/351; 358/153; 358/154; 358/155; 358/156; 358/157

(58) Field of Classification Search ..... None
See application file for complete search history.

(56) References Cited

U.S. PATENT DOCUMENTS

| | | | | |
|---|---|---|---|---|
| 3,569,844 A | * | 3/1971 | Lynn | 328/151 |
| 3,706,847 A | * | 12/1972 | Smeulers | 178/7.35 |
| 3,819,859 A | | 6/1974 | Borsuk et al. | |
| 4,097,896 A | | 6/1978 | Avery | |
| 4,115,811 A | | 9/1978 | Goff | |

(Continued)

FOREIGN PATENT DOCUMENTS

| | | | |
|---|---|---|---|
| GB | 1143241 | * | 2/1969 |
| GB | 2200011 | * | 12/1987 |
| JP | 57-97274 A | * | 6/1982 |
| JP | 58-178669 | * | 10/1983 |
| JP | 58-186270 | * | 10/1983 |

OTHER PUBLICATIONS

Compiation re: Element c) of Claim 33 of U.S. Patent No. 5,754,250 (1 page).
Document entitled "Validity '869 Patent" (26 pages).
Document entitled "Validity '250 Patent" (32 pages).
*Technology Licensing Corporation* v. *Gennum Corporation*, E–Filed May 4, 2007, Document No. 925, Case No. C 01–04204 RS, "Opinion and Order", Honorable Richard Seeborg—Judge, in U.S. District Court for the Northern District of California, San Jose Division, pp. 1–43.
*Technology Licensing Corporation* v. *Gennum Corporation*, E–Filed Jun. 1, 2007, Document No. 931, Case No. C 01–4204 RS, "Judgment", Honorable Richard Seeborg—Judge, in the U.S. District Court for the Northern District of California, San Jose Division, pp. 1–3.
*Technology Licensing Corporation* v. *Gennum Corporation*, E–Filed Jun. 1, 2007, Document No. 930, Case No. C 01–4204 RS, "Order re Entry of Final Judgment", Honorable Richard Seeborg—Judge, in the U.S. District Court for the Northern District of California, San Jose Division, pp. 1–3.

(Continued)

*Primary Examiner*—Brian P. Yenke
(74) *Attorney, Agent, or Firm*—Katten Muchin Rosenman LLP

(57) ABSTRACT

This invention is a method and apparatus for identifying and separating the synchronizing signal component of video like signals by identifying or detecting the arrangement or sequence of the known occurances of events or patterns of the sync. The invention also provides for establishing data slicing references in response to the levels of known portions of the sync component.

88 Claims, 15 Drawing Sheets

U.S. PATENT DOCUMENTS

| | | | | | |
|---|---|---|---|---|---|
| 4,233,629 | A | | 11/1980 | Dayton | |
| 4,298,890 | A | * | 11/1981 | Lai et al. | 358/158 |
| 4,305,091 | A | | 12/1981 | Cooper | |
| 4,313,135 | A | | 1/1982 | Cooper | |
| 4,385,319 | A | | 5/1983 | Hasegawa | |
| 4,498,141 | A | | 2/1985 | Cooper | |
| 4,520,393 | A | * | 5/1985 | Zwijsen et al. | 358/149 |
| 4,532,541 | A | | 7/1985 | Cooper | |
| 4,573,070 | A | | 2/1986 | Cooper | |
| 4,665,431 | A | | 5/1987 | Cooper | |
| 4,680,633 | A | | 7/1987 | Gerdes | |
| 4,703,355 | A | | 10/1987 | Cooper | |
| 4,812,907 | A | * | 3/1989 | Hathaway et al. | 358/153 |
| 4,816,830 | A | | 3/1989 | Cooper | |
| 4,829,257 | A | | 5/1989 | Cooper | |
| 4,866,543 | A | | 9/1989 | Cooper et al. | |
| 4,868,428 | A | | 9/1989 | Cooper | |
| 4,872,070 | A | | 10/1989 | Cooper et al. | |
| 4,882,624 | A | | 11/1989 | Sumiyoshi | |
| RE33,535 | E | | 2/1991 | Cooper | |
| 5,012,340 | A | * | 4/1991 | Kirschenstein | 348/521 |
| 5,097,218 | A | | 3/1992 | Cooper | |
| 5,202,761 | A | | 4/1993 | Cooper | |
| 5,260,790 | A | | 11/1993 | Takayama | |
| 5,424,780 | A | | 6/1995 | Cooper | |
| 5,432,559 | A | | 7/1995 | Bruins et al. | |
| 5,459,524 | A | | 10/1995 | Cooper | |
| 5,486,869 | A | | 1/1996 | Cooper | |
| 5,530,483 | A | | 6/1996 | Cooper et al. | |
| 5,543,743 | A | | 8/1996 | Cooper | |
| 5,548,236 | A | | 8/1996 | Cooper et al. | |
| 5,550,594 | A | | 8/1996 | Cooper | |
| 5,572,261 | A | | 11/1996 | Cooper | |
| 5,592,508 | A | | 1/1997 | Cooper | |
| 5,635,725 | A | | 6/1997 | Cooper | |
| 5,675,277 | A | | 10/1997 | Cooper et al. | |
| 5,675,388 | A | | 10/1997 | Cooper | |
| 5,751,368 | A | | 5/1998 | Cooper | |
| 5,754,250 | A | | 5/1998 | Cooper | |
| 5,793,053 | A | | 8/1998 | Cooper | |
| 5,834,747 | A | | 11/1998 | Cooper | |
| 5,874,910 | A | | 2/1999 | Cooper | |
| 5,920,842 | A | | 7/1999 | Cooper et al. | |
| 5,946,049 | A | | 8/1999 | Cooper et al. | |
| 5,949,087 | A | | 9/1999 | Cooper | |
| 5,996,906 | A | | 12/1999 | Cooper | |
| 6,078,038 | A | | 6/2000 | Cooper | |
| 6,098,046 | A | | 8/2000 | Cooper et al. | |
| 6,141,057 | A | | 10/2000 | Cooper et al. | |
| 6,191,407 | B1 | | 2/2001 | Cooper | |
| 6,308,890 | B1 | | 10/2001 | Cooper | |
| 6,330,033 | B1 | | 12/2001 | Cooper | |
| 6,351,281 | B1 | | 2/2002 | Cooper | |
| 6,392,707 | B1 | | 5/2002 | Cooper et al. | |
| 6,421,636 | B1 | | 7/2002 | Cooper et al. | |
| 6,469,741 | B2 | | 10/2002 | Cooper et al. | |
| 6,529,637 | B1 | | 3/2003 | Cooper | |

OTHER PUBLICATIONS

*Technology Licensing Corporation* vs. *Gennum Corporation*, Trial Day 1, Oct. 16, 2006, Case No. C–01–4204 RS, Transcript of Proceedings before the Honorable Richard Seeborg, United States Magistrate Judge, in U.S. District Court for the Northern District of California, San Jose Division, vol. 1, pp. 1–241.

*Technology Licensing Corporation* vs. *Gennum Corporation*, Oct. 17, 2006, Morning Session, Case No. C–01–4204 RS, Transcript of Proceedings before the Honorable Richard Seeborg, United States Magistrate Judge, in U.S. District Court for the Northern District of California, San Jose Division, vol. 2, pp. 242–355.

*Technology Licensing Corporation* vs. *Gennum Corporation*, Oct. 17, 2006, PM Session, Case No. C–01–4204 RS, Transcript of Proceedings before the Honorable Richard Seeborg, United States Magistrate Judge, in U.S. District Court for the Northern District of California, San Jose Division, vol. 2, pp. 356–454.

*Technology Licensing Corporation* vs. *Gennum Corporation*, Oct. 18, 2006 Case No. C–01–4204 RS, Transcript of Proceedings before the Honorable Richard Seeborg, United States Magistrate Judge, in U.S. District Court for the Northern District of California, San Jose Division, vol. 3, pp. 455–716.

*Technology Licensing Corporation* vs. *Gennum Corporation*, Oct. 19, 2006, Case No. C–01–4204 RS, Transcript of Proceedings before the Honorable Richard Seeborg, United States Magistrate Judge, in U.S. District Court for the Northern District of California, San Jose Division, vol. 4, pp. 717–980.

*Technology Licensing Corporation* vs. *Gennum Corporation*, Oct. 20, 2006, Case No. C–01–4204 RS, Transcript of Proceedings before the Honorable Richard Seeborg, United States Magistrate Judge, in U.S. District Court for the Northern District of California, San Jose Division, vol. 5, pp. 981–1228.

*Technology Licensing Corporation* vs. *Gennum Corporation*, Oct. 23, 2006, Case No. C–01–4204 RS, Transcript of Proceedings before the Honorable Richard Seeborg, United States Magistrate Judge, in U.S. District Court for the Northern District of California, San Jose Division, vol. 6, pp. 1229–1454.

*Technology Licensing Corporation* vs. *Gennum Corporation*, Filed Nov. 21, 2006, Document 904, Case No. C 01–4204–RS, "Gennum's Post Trial Brief", Honorable Richard Seeborg—Judge, in the U.S. District Court for the Northern District of California, San Jose Division, pp. 1–41.

*Technology Licensing Corporation* vs. *Gennum Corporation*, Filed Nov. 21, 2006, Document 905, Case No. C 01–4204–RS, "Gennum's Proposed Findings of Fact and Conclusions of Law", Honorable Richard Seeborg—Judge, in the U.S. District Court for the Northern District of California, San Jose Division, pp. 1–111.

*Technology Licensing Corporation* vs. *Gennum Corporation*, Filed Nov. 21, 2006, Document 906, Case No. CV–01–4204 RS, "Technology Licensing Corporation's Post–Trial Brief", Honorable Richard Seeborg—Judge, in the U.S. District Court for the Northern District of California, San Jose Division, pp. 1–44.

*Technology Licensing Corporation* vs. *Gennum Corporation*, Filed Nov. 21, 2006, Document 907, Case No. CV–01–4204 RS, "Technology Licensing Corporation's Proposed Findings of Fact and Conclusions of Law", Honorable Richard Seeborg, in the U.S. District Court for the Northern District of California, San Jose Division, pp. 1–274.

Plaintiff Technology Licensing Corporation's Opposition To Gennum's Motions For Summary Judgement Of Noninfringement Of U.S. Patent No. 5,754,250 for Case No. CV–01–4204 CRB in U.S. District Court for the Northern District of California, San Francisco Division, Nov. 7, 2003.

Addendum To Expert Reports of Richard Kupnicki For Defendant Gennum Corporation for Case No. CV–01–4204 CRB in U.S. District Court for the Northern District of California, San Francisco Division.

Gennum's Opposition To TLC's Renewed Motion To Stay pending the Outcome of Reissue Proceedings for Case No. CV–01–4204 RS in U.S. District Court for the Northern District of California, San Francisco Division, Sep. 12, 2006.

Declaration of Todd R. Miller In Support of Gennum's Opposition To TLC's Renewed Motion To Stay for Case No. CV–01–4204 RS in U.S. District Court for the Northern District of California, San Francisco Division, Sep. 12, 2006.

Consent Decree And Order for Case No. CV–01–4204 CRB in U.S. District Court for the Northern District of California, San Francisco Division.

Declaration of Richard Kupnicki (II) for Case No. CV–01–4204 CRB in U.S. District Court for the Northern District of California, San Francisco Division, Nov. 7, 2003.

Declaration of Richard Kupnicki for Case No. CV–01–4204 CRB in U.S. District Court for the Northern District of California, San Francisco Division, Nov. 7, 2003.

Gennum's Notice of Motion and Motion for Summary Judgement of Noninfringement and Invalidity of U.S. Patent No. 5,754,250 for Case No. CV–01–4204 CRB in U.S. District Court for the Northern District of California, San Francisco Division, Nov. 7, 2003.

Gennum's Reply in Support of Its Motion for Summary Judgment on Non–Infringement and Invalidity of U.S. Patent No. 5,754,250, for Case No. CV–01–4204 CRB in U.S. District Court for the Northern District of California, San Francisco Division, Nov. 7, 2003.

Exhibits A–1, A–2, B–1, B–2, B–3, B–4, B–5, B–6, C–1, C–2, D–1, D–2, E–1, E–2, F–1, F–2, G–1, G–2, H–1, H–2, I–1, I–2, J, K, L, M, and N accompanying Expert Report of Richard Kupnicki for Case No. CV–01–4204 CRB in U.S. District Court for the Northern District of California, San Francisco Division.

Expert Report Of Richard Kupnicki For Defendant Gennum Corporation for Case No. CV–01–4204 CRB in U.S. District Court for the Northern District of California, San Francisco Division.

Letter to J. Carl Cooper (Technology Licensing Corporation) from John Mackie (Gennum corporation), Jun. 30, 2004.

Sept. 6, 2006 email from Timothy J. Vezeau to J. Donald McCarthy, Mitch Mitchell, and Gloria C. Perez with a copy sent to Michael A. Dorfman, which is attached to a Sep. 6, 2006 email from J. Donald McCarthy to Mitch Mitchell and Gloria C. Perez with a copy sent to Michael A. Dorfman and Timothy J. Vezeau.

[Proposed] Order Granting Gennum's Motions for Summary Judgement On The '250 Patent for Case No. CV–01–4204 CRB in U.S. District Court for the Northern District of California, San Francisco Division.

Trial Exhibit 296 for Case No. CV–01–4204 CRB in U.S. District Court for the Northern District of California, San Francisco Division, Rebuttal of Invalidity Assertions Re U.S. Patent No. 5,754,250.

Elantec EL4581C Data Sheet May 1993 Rev A.*

Elantec EL4583C Nov. 1993 Rev. A.*

TV Technology "And the Winner is VSB . . . Maybe" Weiss, Apr. 1994.*

Schematic for Sync/Color Bars Generator, Sheet 1 of 6 dated May 30, 1989.

Schematic for Sync/Color Bars Generator, Sheet 2 of 6 dated May 30, 1989.

Schematic for Sync/Color Bars Generator, Sheet 3 of 6 dated May 30, 1989.

Schematic for Sync/Color Bars Generator, Sheet 4 of 6 dated May 30, 1989.

Schematic for Sync/Color Bars Generator, Sheet 5 of 6 dated May 30, 1989.

Schematic for Sync/Color Bars Generator, Sheet 6 of 6 dated May 30, 1989.

Enlargement of Schematic for Sync/Color Bars Generator, Sheet 1 of 66 dated May 30, 1989.

Data Package 9505—Color Black Sync Pulse Generator Module Assembly Number: 066582–00—1977.

Instruction Manual—DPS–1 Operations Manual (Digital Video Systems) dated Nov. 22, 1977.

Instruction Manual—DTG–1000N Digital Test Generator (Leitch Video Limited).

Instruction Manual—DVL 2002 Video Processor Operation and Maintenance Manual (Digital Video Systems) dated Aug. 1976.

LM1881 Video Sync Separator Application (Preliminary)—National Semiconductor Corporation dated May 1987.

Infringement of US 5,754,250 by Elantec EL4583—Video Sync Separator IC—dated Dec. 10, 1998.

Infrigement of US 5,754,250 by Elantec EL1882–Video Sync Separator IC–dated Dec. 9, 1998.

Infringement of US 5,754,250 by Elantec EL4581—Video Sync Separator IC—dated Dec. 10, 1998.

Rebuttal Expert Report of J. Carl Cooper Regarding U.S. Pat. No. 5,754,250 dated Aug. 15, 2003.

Cooper Rebuttal to Kupnicki Exhibit A–2, undated.

Cooper Rebuttal to Kupnicki Exhibit B–2, undated.

Cooper Rebuttal to Kupnicki Exhibit B–4, undated.

Cooper Rebuttal to Kupnicki Exhibit B–6, undated.

Cooper Rebuttal to Kupnicki Exhibit C–2, undated.

Cooper Rebuttal to Kupnicki Exhibit D–2, undated.

Cooper Rebuttal to Kupnicki Exhibit E–2, undated.

Cooper Rebuttal to Kupnicki Exhibit F–2, undated.

Cooper Rebuttal to Kupnicki Exhibit G–2, undated.

Rebuttal to Kupnicki Exhibit J, undated.

Rebuttal to Kupnicki Exhibit K, undated.

Claim Construction Order dated Nov. 14, 2002.

Confirmation of Notice Pursuant to 35 U.S.C. § 282, dated Dec. 4, 2003.

GS4882, GS4982 Video Sync Separators with 50% Sync Slicing—Data Sheet, undated.

Expert Report of J. Carl Cooper in Rebuttal to the Expert Report of Richard Kupnicki for Defendant Gennum Corporation, dated Aug. 15, 2003.

GS1881, GS4881, GS4981 Monolithic Video Sync Separators—Data Sheet, dated Oct. 1995.

Third–Party Defendant Gennun's Claims Against Plaintiff Technology Licensing Corporation, and Statement of Third–Party Plaintiff's Defenses Against Plaintiff dated Jan. 6, 2003.
Defendant Gennum Corporation's Preliminary Invalidity Contentions for U.S. Patent No. 5,754,250 dated May 16, 2003.
Third–Party Defendant Gennum's First Amended Claims Against Plaintiff Technology Licensing Corporation and Third Party Claim Defendant J. Carl Cooper for: (1) Declaratory Judgment (2) § 43(a) of the Lanham Act (3).
Gennum's Trial Brief dated Apr. 1, 2004.
Millman, Jacob, Ph.D. and Halkias, Christos C., Ph.D., *Integrated Electronics: Analog and Digital Circuits and Systems*(McGraw–Hill Book Company, 1972), pp. 99, 100, 568.
Digital Video Systems Input Clock Generator 7051 Circuit Schematic dated 1981.
Exhibit B–4—Claim Chart Comparing U.S. Patent No. 5,754,250 and Digital Video Systems Input Clock Generator 7051, undated.
Leitch Video Technology 1000GG Circuit Schematic dated 1981.
Exhibit B–6—Claim Chart Comparing U.S. Patent No. 5,754,250 and U.S. Patent No. 4,097,896, undated.
Exhibit C–2—Claim Chart Comparing U.S. Patent No. 5,754,250 and U.S. Patent No. 4,097,896, undated.
Exhibit D–2—Claim Chart Comparing U.S. Patent Nos. 5,486,869//5,754,250 and U.S. Patent No. 4,233,629, undated.
Instruction Manual for Grass Valley Group SCB–200N Sync/Color Bar Generator, pp. 4–1 to 4–7 and Circuit Schematic dated 1989.
Exhibit E–2—Claim Chart Comparing U.S. Patent Nos. 5,486,869/5,754,250 and Grass Valley Group SCB–200N Sync/Color Bar Generator, undated.
National Semiconductor Databook for LM1881, pp. 3–88 to 3–94 dated 1989.
Exhibit F–2—Claim Chart Comparing U.S. Patent Nos. 5,486,869/5,754,20 and National Semiconductor LM1881, undated.
Exhibit G–2—Claim Chart Comparing U.S. Patent Nos. 5,486,869/5,754,250 and U.S. Patent No. 5,260,790, undated.
Elantec EL4581C/EL4583C Video Sync Separator Data Sheet, pp. 4–136 to 4–151, dated 1993.
Exhibit H–2—Claim Chart Comparing U.S. Patent No. 5,754,250 and Elantec EL4581C/EL4583C, undated.
Exhibit I–2—Claim chart Comparing Claim 39 of U.S. Patent No. 5,754,250 and U.S. Patent No. 5,432,559, undated.
[Proposed] Pretrial Order dated Mar. 12, 2004.
Expert Report of J. Carl Cooper in Rebuttal to the Expert Report of Richard Kupnicki for Defendant Gennum Corporation dated Aug. 15, 2003.
Revised Joint Claim Construction and Pre–Hearing Statement Pursuant to Patent L.R. 403 dated Sep. 10, 2002.
Plaintiff Technology Licensing Corporation's Opening Brief on Claim Constructions dated Sep. 12, 2002.
Plaintiff Technology Licensing Corporation's Reply Brief on Claim Construction dated Oct. 4, 2002.
Defendant Videotek Inc.'s Brief in Support of Its Proposed Claim Construction dated Sep. 27, 1002.
[Proposed] Claim Construction Order dated Sep. 2002.
Defendant Videotek's Preliminary Invalidity Contentions for U.S. Patent No. 5,754,250 dated May 9, 2002.
Defendant Videotek, Inc.'s Final Invalidity Contentions Under PLR 3–6(b) for U.S. Patent No. 5,754,250 dated Jan. 7, 2003.
Supplemental Confirmation of Notice Pursuant to 35 U.S.C. § 282 dated Mar. 5, 2004.
Millman, Jacob and Grabel, Arvin, *Microelectronics*(*Second Edition*), (McGraw–Hill Book Company, 1987), pp. 675–667.
Elantec EL4581 Sync Separator, 50% Slice, S–H, filter Data Sheet dated 2003.
Elantec EL4583 Sync Separator, 50% Slice, S–H, Filter, $H_{out}$ Data Sheet dated 2003.
National Semiconductor LM1881 Video Sync Separator, undated.
Digital Video System Input Sync Separator 5179 Circuit Schematic dated 1979.
Cooper, J. Cart, "Viewer Stress from Audio/Visual Sync Problems", *SMPTE Journal*, vol. 97, No. 2, pp. 140–142, Feb. 1988.
Cooper, J. Carl, "Video–to–Audio Synchrony Monitoring and Correction", *SMPTE Journal*, vol. 97, No. 2, pp. 695–698, Sep. 1988.
Cooper, J. Carl, "Sine Squared Shaping of Sync and Drive Pulses", *IEEE Transactions on Broadcasting* , vol. 36, No. 2, pp. 162–169, Jun. 1990.
Cooper, J. Carl, "Second generation audio–to–video synchronization", *Broadcast Engineering*, pp. 68–72, Sep. 1995.
Complaint by Defendant and Third Party Plaintiff Videotek, Inc. Against Third Party Defendant Gennum Corporation for Breach of Warranty dated Sep. 3, 2002.
Product brochure –DVL 2002 Video Processor –"Maximizing Printer Quality".
Product brochure –DPS–1 by Digital Video Systems –"First in a new advanced class of digital processors?".
Product brochure –DPS–1 by Digital Video Systems –"Setting a new standard for the industry/ The Third Generation Time Base Corrector".
DPS–1 Digital Processing System price list dated Oct. 1978.
Brochure entitled DPS–1 Frame Store dated Mar. 1979.
Promotional Brochure entitled Phaser dated Mar. 1979.
Schematic for an electronic circuit –Digital Video Systems Drawing No. 1DS–5179–1 dated Sep. 21, 1976.
Schematic for circuit design for Digital Video Systems dated 1979.
Enlarged version of Exhibit 388, dated 1979.
Schematic for the 1000GG drawn by Susan Van Nood dated Dec. 2, 1984.
Schematic for lCG 7051–Input Clock Generator –Drawing No. 743H72, Digital Video Systems.
Instruction manual –DTG 1000N Digital Test Generator, Leitch.
Advance Product Information/STG–1000 Digital Test Generator, Leitch.
Proprietary Information/DTS–2000N Digital Television Scrambler & DTD–2000N Digital Television Descrambler, Preliminary Instruction Manual dated May 26, 1982.
Input Clock Generator (lCG 7051 –1) Preliminary Circuit Description and Test Procedures –Prepared by Joseph Yu dated Sep. 1977.

* cited by examiner

COMPARATOR
122
401
402
403
404
405
R/C
CLR
+5V
R38
R39
R40
R41
R42
R43
R44
R45
R46
R47
R48
R49
R50
R51
R52
R53
C15
C16
C17
C19
C20
C21
C22
C1
C18
I7
I8
I9
I10
I11
A1
A2
D1
D2
D3
D4
OP17
OP18
OP19
SW_L
SW_T
SW_U
V_P1
V_P2
V_P3
V_C3
126
128

H SYNC OUT
HDTV
NTSC
H SQUARE WAVE OUT
CS□ FIG11
COMP SYNC OUT
/COMP SYNC OUT
FIELD OUT
OPEN=NTSC
CLOSED=HDTV
t =15μS FOR NTSC
t =30μS FOR HDTV
17<t<20μS FOR HDTV
35<t<50μS FOR NTSC
6<t<10μS
85<t<200NS
1.4<t<2.8μS
PRECISION SYNC SLICER
LM360N
FIG9 10K TOP
10K BOT FIG9
FIG8 RES 71.5
04-2 FIG11

SYNCHRONIZING SIGNAL SEPARATING APPARATUS AND METHOD

Matter enclosed in heavy brackets [ ] appears in the original patent but forms no part of this reissue specification; matter printed in italics indicates the additions made by reissue.

This application is a continuation-in-part of application Ser. No. 08/493,661, filed Jun. 22, 1995, now abandoned which is continuation in part of U.S. patent application Ser. No. 08/165,688 filed Dec. 13, 1993 now U.S. Pat. No. 5,486, 869*, which is a continuation of application Ser. No. 07/837, 323, filed Feb. 18, 1992, now abandoned.*

BACKGROUND OF THE INVENTION

The present invention relates to signal processing systems and, in [particularly] *particular*, to video signal processing. A major objective of the present invention is a synchronizing signal processing apparatus and a method that precisely recovers synchronizing signals of a video signal.

Much of modern technology depends on signal processing. A common application of signal processing is for [the] video type signals. Usually, a video type signal includes an information signal component and picture or data synchronizing information [comprised] *component*. The synchronizing information is transmitted for scanning in a receiver in exact synchronism with a camera-tube scanning. The synchronization signal must first be recovered from the video signal.

More particularly, TV (Television) video signals, [the] *an* example of the video signal, are processed to obtain desired picture quality. A TV transmitting station modulates video and audio signal component and a synchronizing component which is used to identify the location of segments of the information component. The synchronizing component typically is comprised of a predetermined sequence of characteristics which are repeated periodically. Most commonly, NTSC television signals are comprised of an active video portion with two level sync pulses periodically positioned between the active video portions. In particular, in order to precisely reproduce pictures, synchronizing information is added in the video signal so that the receivers can synchronously perform scanning operation as the TV transmitting station does.

Numerical and graphical criteria which describe essential aspects of a TV system[,] *are* employed in the design and operation of equipment to assure that the various parts of the system will operate in cooperative fashion at maximum performance. TV systems have a special need, compared with other communication systems, for definitive standards because television transmitters and receivers must operate in a precise lock-and-key relationship. In particular, the scanning of the image in the camera must be matched by the scanning in every associated receiver within a timing precision of approximately one-tenth of a millionth of a second, and with relative positions of picture details correct to a few hundredths of an inch as viewed on the CRT or other display.

To assure that any television receiver can receive programs from any transmitter within range, it is customary to set up a single set of standards with a group of neighboring countries. The TV transmitting stations of different countries and areas transmit video signals with different formats. For example, U.S.A., Canada and Japan et al. use NTSC (National Television System Committee) system. France, the former Soviet Union countries et. al. use SECAM. Moreover, HDTV (High Definition TV) creates a new system with images of high resolution as well as a new video signal format and new transmission methods. For all of these examples, the synchronizing signals added in their video signals are different, but share similar characteristics.

Picture synchronizing information is obtained from the video signal by means of sync separation circuits. In addition, these circuits must separate this information from noise and interference during the reception of weak signals, particularly if impulse noise is present. To reproduce these different video signals of respective systems, different video signal processing devices are needed to provide required synchronizing signals.

Conventional video signal devices for processing the synchronizing information of the video signals can not be used for different standard video signals for providing reliable synchronizing signals, without affecting the reproduction of the video signals or causing high cost of video signal processing. What is needed is a synchronizing signal processing apparatus and method that precisely recovers synchronizing signals of the video signal and can be applied for processing different video signals.

SUMMARY OF THE INVENTION

The present invention provides for detecting a synchronizing portion of a video type signal, and for signals which transmit digital or constrained multilevel analog data providing reference signals fro slicing the data portion of the signal in response to the synchronizing component. As used herein for the purposes of describing and claiming the present invention the video type signal will be described as the type having periodic known patterns which comprise the sync portion with the sync portions being interspersed with video like or other information carrying signals such as data with this information carrying portion being referred to as video and data both terms of which are intended to include any information carrying signal. A group consisting of at least a sync portion and a information carrying portion will be referred to as a data group.

This process of detecting the synchronizing portion of the video type signal involves identifying or detecting the arrangement of the known pattern of the sync or other identifier. For purposes of describing and claiming the present invention detecting shall be understood to encompass, inspecting, identifying, recognizing, distinguishing and any other means or method of ascertaining the presence, occurrence or location of the feature of interest. The present invention provides for such detecting by detecting a first transition of a known direction and amplitude, and inspecting the first transition to see if it occurs in a proper relation to a second known occurrence. The detection of the proper relation of the known occurrences is preferred to be made by delaying a signal marking the first occurrence for an amount equal to the expected arrival of the second occurrence and determining if the two are approximately coincident, thereby indicating the proper relationship. Further checking may be made by including a third or more occurrences to ensure proper relationships, for example by checking to determine if the first or second occurrence takes place an expected time before or after an event.

In order to establish references for data slicing the amplitude and D.C. level of components of the sync portion are used to establish the D.C. level and gain of the reference signals. Because the gain and D.C. levels may change throughout the signal, it becomes necessary to remove these changes from the signal and/or adjust the references accordingly. This capability is provided by establishing or measuring some known parameter at each end of a segment of data or video in order to be able to estimate these changes, or eliminate these changes, during the segment.

In accordance with the present invention, a synchronizing signal processing apparatus includes means for sampling synchronizing type signals and components of a video type signal. The present invention further includes slicing a video type signal in response to the sampled synchronizing signals. The synchronizing signal processing apparatus includes a sampling means that samples synchronizing signal components and provides at least a reference signal. The synchronizing signal processing apparatus also includes a comparing means that slices the video signal in response to at least a reference signal responsive to different levels of components of the synchronizing pulses. Thus, the synchronizing signal processing apparatus generates logic level outputs. The video signal with which the present invention is used may be of a standard type having synchronizing pulses including horizontal synchronizing pulses or may be of the proposed HDTV type or of other type having a sync portion made up of a known sequence of components and a information carrying portion carried therewith.

The video signal may be sliced, before it is sampled, to eliminate noise. The sliced video signal corresponds to the synchronizing pulses. In response to the sliced video signal, the peaks of the synchronizing pulses of the video signal are precisely sampled. Two sampled signals represent the positive and negative peaks of the synchronizing pulses. The two sampled signals further are divided into three reference signals to compare with the video signal. After this comparison, the logic outputs are combined to recover synchronizing pulses that are reliable, precise and without noise.

A combining means couples to the comparing means so that the outputs from the comparing means are combined depending on the type of the video signal. The combining means generates a plurality of synchronizing signals.

To provide a vertical synchronizing signal, the present invention uses an integrating type filtering means that filters one of synchronizing signals output from the combining to provide a vertical synchronizing signal. The filter means shows a good frequency response characteristic for the vertical synchronizing signal.

The synchronizing signal processing method in accordance with the present invention comprises steps of slicing a video signal, sampling the video signal in response to respective leading and trailing edges of the sliced signal, converting the sampled signal into at least a reference signal, comparing the reference signal with the video signals and combining the compared outputs to recover synchronizing pulses.

An advantage of the synchronizing signal processing apparatus and method is that the present invention incorporates several standard functions with superior performance. The synchronizing signal processing apparatus in accordance with the present invention is capable of operating with standard two level synchronizing pulses, for example, NTSC, PAL and SECAM type synchronizing pulses, and three level synchronizing pulses, for example HDTV synchronizing pulses. The present invention may also applied for other video type signals with synchronizing pulses.

Furthermore, the present invention provides good bandwidth properties and time constant in the video amplifier section. The combination of both proper bandwidth and time constant gives considerably noise immunity against high frequency noise, yet maintains sufficient operation speed for high performance. Therefore, no additional compensation or filtering components are needed.

The synchronizing signal processing apparatus in accordance with the present invention may be easily adjusted for either two level or three level synchronizing pulses. The recovered synchronizing levels for video signals are characterized by high precision and reliability.

The logic level outputs of the comprising means are combined, the combination depending on whether the synchronizing pulses are two levels or three levels. In accordance with the present invention, the synchronizing signal processing apparatus may generate a TTL (Transistor-Transistor level) version of the synchronizing pulses.

The synchronizing signal processing apparatus in accordance with the present invention may be used with different video devices, which simplifies the design and manufacture of video devices, and significantly decreases the cost to make these video devices.

Another advantage of the synchronizing signal processing apparatus of the present invention is that it is suitable to be implemented by integrated circuits. Alternatively, the video signal processing can be implemented by software, such as in signal processing applications. These and other features and advantages of the present invention are apparent from the description below with reference to the following drawings.

DESCRIPTION OF THE PREFERRED EMBODIMENTS

Figure 1:
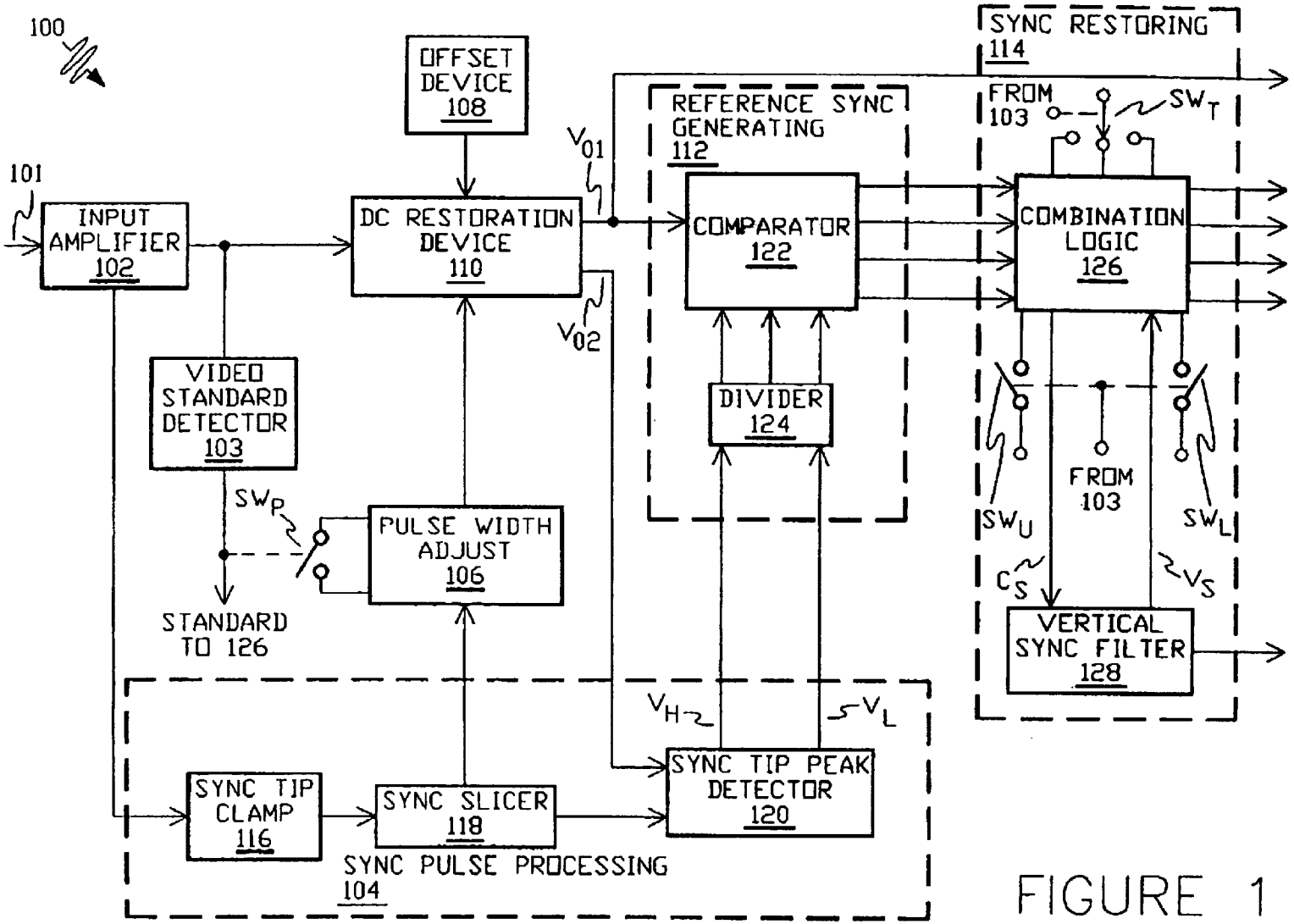
FIG. 1 is a block diagram of a synchronizing signal processing apparatus in accordance with the present invention.

A synchronizing signal processing apparatus 100 in accordance with the present invention includes an input [amplified] *amplifier* 102, a video standard detector 103, a sync pulse processing section 104, a pulse width adjust 106, an offset device 108, a DC (Direct Current) restoration device 110, a reference sync generating section 112 and a sync restoring section 114.

Video signal [116] *101* is applied to differential input amplifier 102 where video signal 101 is amplified to improve the ratio of signal/common mode noise. The video signal amplified by input amplifier 102 is fed to sync pulse processing section 104 which includes a sync tip clamp 116, a sync slicer 118 and a sync tip peak detector 120.

The video signal is first clamped by sync tip clamp 116 to generate a clamped signal which has a known DC level of the synchronizing pulses. The clamped signal is then transferred to sync slicer 118 where the clamped signal is sliced, thereby generating a signal that has the same time period as that of the synchronizing pulses but at standard levels as compared to that of the synchronizing pulses, in this example TTL levels. To effectively eliminate interference and noise, the sync slicer 118 slices the synchronizing pulses at a known level which is preferred to be about half of the nominal expected amplitude of the synchronizing pulses. Due to a known level which is approximately half the expected level, the operation of sync slicer 118 may be considered a coarse slicing operation which provides coarse sliced pulses. The sliced signal is coupled to sync tip peak detector 120, in which peaks of synchronizing pulses of the video signal from DC restoration device 110 are sampled in response to the sliced signal.

The clamped signal is also delivered to pulse width adjust 106. This clamped signal activates pulse width adjust 106 to generate a pulse trigger signal coupling to DC restoration device 110. The pulse trigger signal determines the pulse width of the synchronizing pulses. A switch $SW_P$ is provided so that this switch is open, which indicates that the video signal is a NTSC TV signal. On the other hand, when the video signal output from the input amplifier 102 is a HDTV signal, the video standard detector 103 will turn switch $SW_P$ on. The video standard detector 103 also control switches $SW_T$, $SW_U$, and $SW_L$. The switches may be operated automatically in response to a video standard detector 103 which detects the type of signal 101. Therefore, the synchronizing signal processing apparatus 100 in accordance with the present invention may process different video signals.

Offset device 108 provides a DC reference for DC restoration 110. The amplified video signal from the input amplifier 102 is also coupled to DC restoration 110. In response to the reference from offset device 108, DC restoration 110 clamps the amplified video signal to eliminate DC shift and residual common mode noise.

Other types of DC restoration circuits may be used as is well known in the art. It is desired to have the video signal [$V0_1$] $V_{01}$ and [$V0_2$] $V_{02}$ restored to a known value. However, it should be noted that the DC restoration device 110 may be eliminated by directly AC coupling the video signal output from the input amplifier 102 to the reference sync generating section 112 and sync pulse processing section 104. The operation of sync tip peak detector 120 will track the variations in the AC coupled video signal output from the input amplifier 102 and allow the comparator 122 to function properly. However, the use of a DC restoration device is preferred. The DC restoration device 110 produces two output signals [$V0_1$] $V_{01}$ and [$V0_2$] $V_{02}$. The clamped video signal [$V0_2$] $V_{02}$ is delivered to sync tip peak detector 120. In response to the sliced signal from the sync slicer 118, sync tip peak detector 120 samples the positive and negative peaks of synchronizing pulses of the clamped video signal so as to provide two peak sample pulse signals. For [purpose] *purposes* of the present example, video is described with respect to positive white with the negative level of sync being that which is farthest from peak white video and the positive level of sync being that which is closest to the peak white value of the video. For two level sync, such as NTSC, the positive peak will correspond to video blanking level. The two peak sample pulse signals define each of *the* synchronizing [pulse] *pulses*. Divider 124 receives them and converts them into three pulse reference signals. The amplitudes of the pulse reference signals represent percentage levels of sync of [$V0_2$] $V_{01}$ during the respective ones of the peak sample pulses as represented by $V_H$ and $V_I$.

Reference sync generating section 112 also includes a comparator 122. The clamped video signal from D.C. restoration 110 and three pulse reference signals are coupled to comparator 122. By comparison, comparator 122 outputs four level signals during each synchronizing pulse of the video signal. Due to the use of references which are responsive to the actual level of the sync pulse, the comparator 122 may be considered a precision comparator, which outputs precision sliced pulses. The four level signals represent different amplitudes of each synchronizing pulse as determined by the video sync being greater than none, one, two or three of the pulse reference signals.

A sync restoring section 114, which includes combination logic 126 and vertical sync filter 128, is arranged to receive the output signals from the comparator 122 of reference sync generating section 112. The combination logic 126 is used to combine the four output signals from comparator 122 to recover reliable synchronizing signals. Switches $SW_U$ and $SW_L$ are arranged to control the switching between the HDTV video signal and conventional TV video signals, for example NTSC TV video signal.

The opening of switches $SW_U$ and $SW_L$ indicates that the synchronizing signal processing apparatus operates with conventional video signal. Otherwise, the closing of the switches $SW_U$ and $SW_L$ shows [out] that the apparatus operates with HDTV video signal. The position of another switch $SW_T$ is also related to the video signal being processed by the apparatus in [according] *accordance* with the present invention. Therefore, the apparatus of the present invention is suitable to different video signals by changing status of these switches, which may respond automatically to the video standard detector 103 as well.

The vertical sync filter 128 is coupled to the combination logic 126. A composite synchronizing signal $C_S$ from the combination logic 126 is coupled to it. The vertical sync filter 128 filters the composite synchronizing signal $C_S$ to provide a vertical synchronizing signal $V_S$. The vertical sync filter 128 may respond to *a* composite synchronizing signal from other sections as well, for example from 112.

Figure 2:
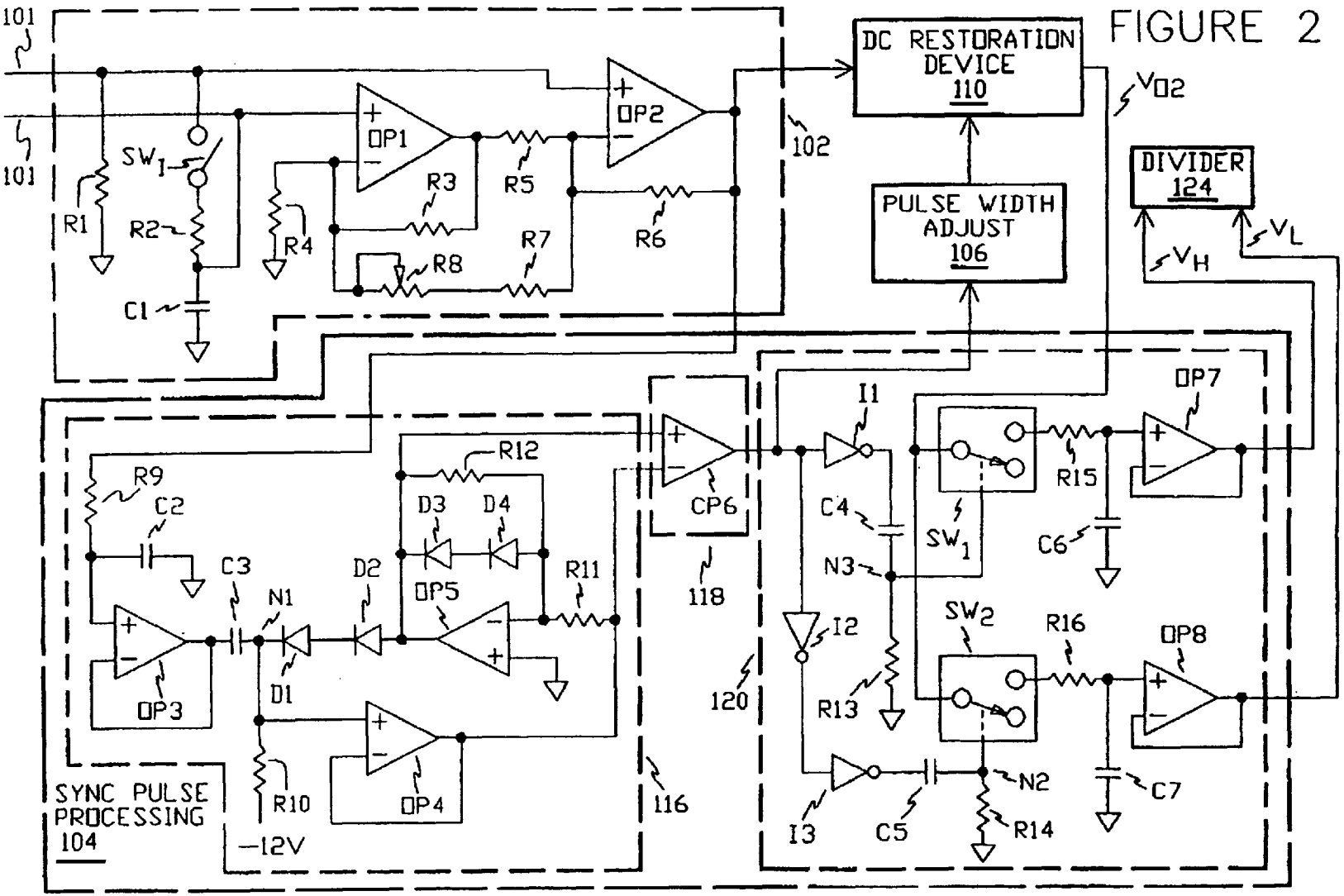
FIG. 2 illustrates a detailed circuit diagram of a sync pulse processing section of the synchronizing signal processing apparatus of FIG. 1.

The sync pulse processing section 104 of synchronizing signal processing apparatus 100 is detailed with reference to FIG. 2. Input amplifier 102 includes two operational amplifiers OP1 and OP2. OP1 is used with OP2 to eliminate common mode noise of the video signal 101. The positive input of OP1 receives one of input video signal 101 which is the common one (shield) of the input signals. Resistor R1, 100KΩ, is an input resistor for stabilizing the DC component of the input video signal.

A resistor R2 (75Ω) and a switch $SW_I$ are connected between the input lines for terminating video signal 101. When the input is taken from other than the end of a coaxial cable run, $SW_I$ is open. While the video signal 101 is applied to input amplifier 102 at the end of a coaxial cable run. $SW_I$ is closed so that the input resistance of input amplifier 102 is matching the output resistance of the circuitry providing video signal 101, thereby reducing signal loss. Capacitor C1 (0.1 μf) provides a high frequency bypass from the common to ground. R2 is the terminating resistor (75Ω). OP1 and resistors R3 (1.10KΩ) and R4 (499Ω) constitute a negative feedback amplifier its gain being two approximately. The output of OP1 is coupled to the negative input of OP2 via resistor R5 (2.21KΩ).

The positive input of OP2 receives the signal directly from the input signal [102] *101*. OP2 and resistors R6, R7 and potentiometer R8 provide another feedback amplifier. Resistor R6 and R7 have the same resistance, 1.0KΩ. The potentiometer R8 has a resistance from 0–10KΩ. Thus, the gain of the input amplifier 102 may be adjusted between 1.5–3. Due to the delay caused by OP1, the common mode component of *input* signal [102] *101* arrives at the positive and negative inputs of OP2 at slightly different moment. Under low frequency, the delay due to OP1 is tolerable. However, high frequency components of the input video signal, after delay by OP1, would severely affect correlation of the common mode signal, causing distortion of *the* video signal. Therefore, a filter having capacitor C1 of 0.01 μf is utilized to filter the interference and noise to ground.

The output of OP2 is coupled to the sync tip clamp 116 of the sync pulse processing section 104. The sync tip clamp 116 includes buffers OP3 and OP4, and an amplifier OP5. Resistor R9 (5.6KΩ) is used with capacitor C2 to by-pass undesired frequency components. The buffered video signal is coupled to the positive input of another buffer OP4 via an isolating capacitor C3, 0.1 μf.

A negative 12V is applied to the isolating capacitor C3 and the positive input of OP4, via a current limit resistor R10, 147KΩ. R10 effectively constitutes a constant current source. The isolating capacitor C3 is used to isolate the direct current components of the video signal.

The negative 12V applied to the capacitor C3 draws node N1 toward a negative level, pulling the video signal output from OP3 to a negative level. The negative video signal, after buffering by buffer OP4, is coupled to the negative input of the amplifier [OPS] *OP5* via a resistor R11 with resistance of 10KΩ. [OPS] *OP5* and a resistor R12 with resistance of 39KΩ [established] *establishes* a negative feedback amplifier. The positive input of [OPS] *OP5* is grounded. The resistance of the resistor R12 determines the maximum gain of amplifier OP5, which [my] *may* be lowered if *diodes* D3, D4 conduct.

Normally, the output of OP5 is negative. Two diodes D1 and D2 are provided to isolate the output of OP5 from the node N1. When the output of [OPS] *OP5* is above a level required to turn [the] D1 and D2 on, for example 1.2 V, the capacitor C3 is charged positive. The resistor R10 charges C3 negative, but is countered by the current through D1 and D2 when the video signal is below the ground of the positive input of OP5, thus causing N1 to move in a positive direction, which forces the output signal of [OPS] *OP5* to be returned to a negative value. The other two diodes D3 and D4 are arranged between the negative input and output of OP5. When the video signal at the negative input of OP5 is more positive by a level high enough to turn D3 and D4 on, the negative input and output of OP5 are shorted so that OP5 functions as a buffer and prevents large negative excursions at the output, thereby causing OP5 to recover to normal status very quickly, when returning positive.

Sync slicer 118 includes a comparator CP6. The output of OP5 is directed to the positive input of CP6. The output of OP4 is directed to the negative input of CP6. By comparison of the signals at its input. CP6 slices the synchronizing pulses of the video signal at about half of the amplitude. By using both the outputs of OP4 and OP5, the comparison is less sensitive to noise and sync amplitude variations than if a fixed level were used. For the NTSC and HDTV video signals, the output of CP6 has a delay *of* about 0.1 μS. Comparator CP6 slices the amplitude of the synchronizing pulses without appreciable change of pulse width.

The sliced pulses output from CP6 are directed to the sync tip peak detector 120. The sync tip peak detector 120 includes sample switches $SW_1$ and $SW_2$, and two sample holders consisting *of* resistors R15 and R16 with the same resistance of 1KΩ, and capacitors C6 and C7 with the same capacitance of 0.1 μf. Resistor R15, capacitor C6 and switch $SW_1$ constitute a sample and hold circuit. Resistor R16 and capacitor C7 and $SW_2$ constitute another sample and hold circuit. Two buffers OP7 and OP8 are respectively coupled to the two sample and hold circuits to output the sampled signals.

The sliced pulsed from CP6 are first inverted by an inverter I1. Thus, the rising edge of the inverted pulses coincide with the trailing edge of the output pulses of CP6. Each of the inverted pulses is then differentiated at its rising edges, by means of a differential capacitor C4 of 0.001 μf and a differential resistor R3 of 330Ω. The switch $SW_1$ is in the receipt of the signal [$V0_2$] $V_{02}$ output from the DC restoration device 110. Usually, switch $SW_1$ is tied to ground via resistor R13. Only upon the arrival of the rising edges of the inverted pulses, switch $SW_1$ is activated to couple to the hold circuit having R15 and C6. Therefore, corresponding to each falling edge of the sliced pulses output from CP6. R15 and C6 sample the positive peaks of the pulses. Note that the sliced sync from CP6 is opposite in polarity to the sync of [$V0_2$] $V_{02}$. The sampled positive peak is held for the buffer OP7 to output. The width and amplitude of *the* differential pulse for sampling the video signal is set by C4 and R13.

The sampling time may also be controlled by the addition of a oneshot in the path from the differential node N2 or N3 and the control input of the respective switch. It is preferred that the sampling start after all ringing which might be present on the preceding edge has had time to die out, or to an acceptable level, and end before any preshoot which may be present on the next edge, for the same reasons. It is also preferred that the sampling time be substantially equal to an integral number of cycles of any coherent or repetitive interference which may be present on the waveform in order that it will average or integrate to zero (if the interference is bipolar and uniformly distributed) or a steady value (if the interference is unipolar or nonuniformly distributed) in the hold circuit.

Figure 9:
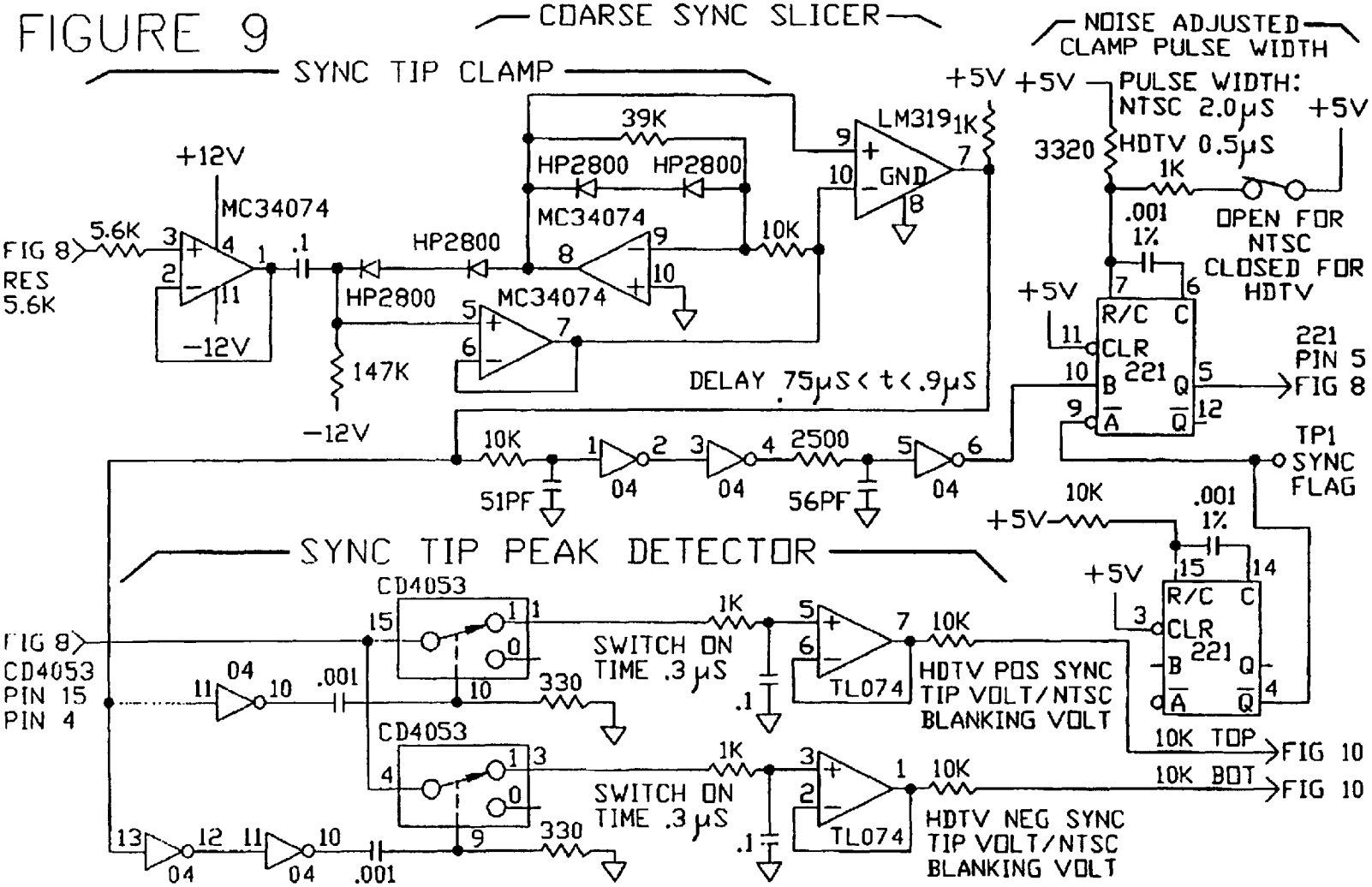
Figure 10:
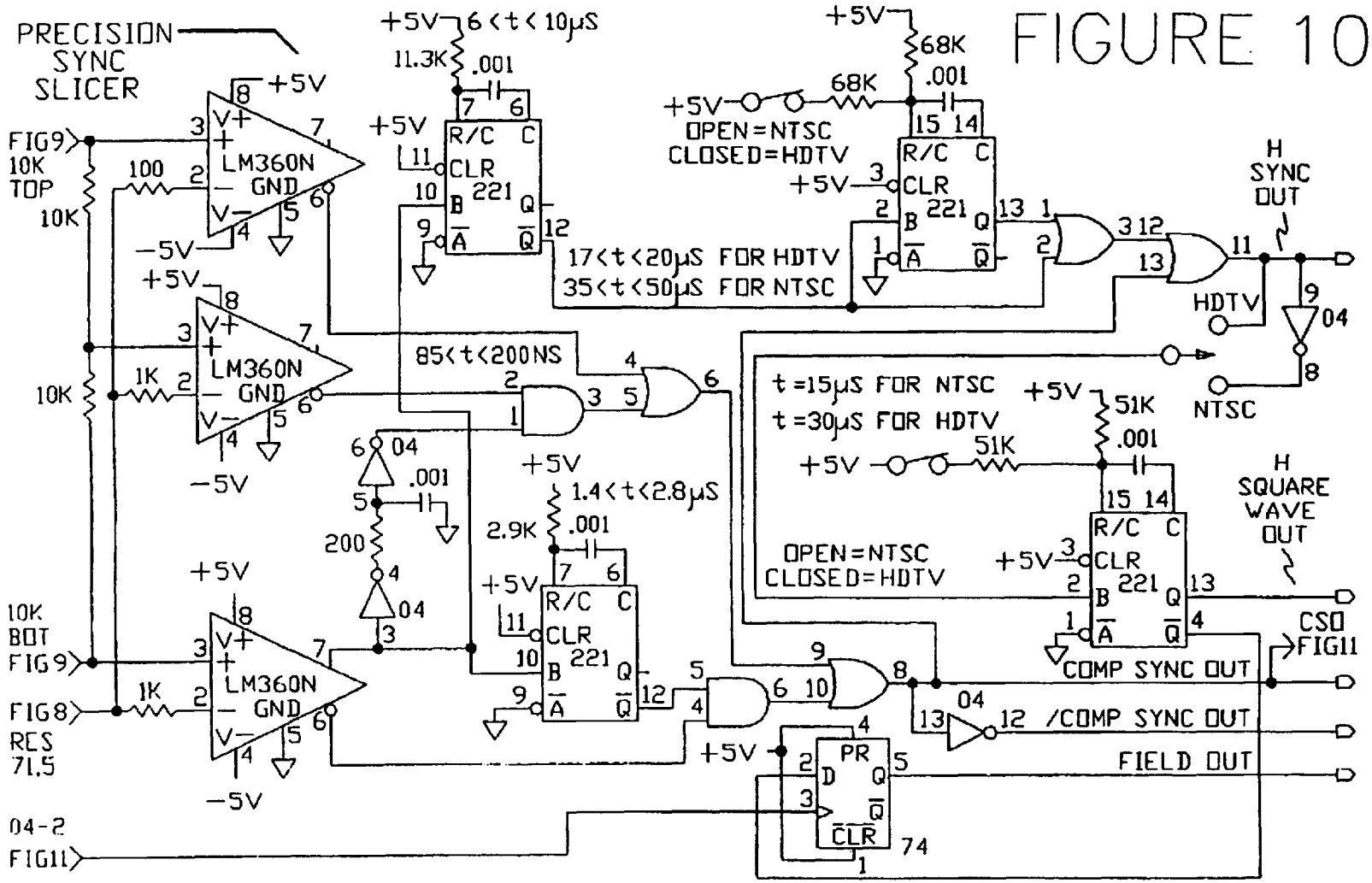

The amplitude of the pulse applied to the switch control input (or to the oneshot trigger input) is critical. It is desired to select the values of the differential network in relation to the expected amplitude and/or risetime of sync edges and to the switch control or oneshot input threshold to ensure that edges having less than the nominal value of sync edges (40 IRE units for NTSC) amplitude do not cause false sampling. Such low amplitude edges will sometimes occur in response to noise impulses which are so fast that the comparator CP6 is unable to make a full scale transition at its output during the pulse duration. The component values given in FIG. 9 provide such protection.

For example, for the ICs suggested the threshold is set internally at ½ VCC. The differentiation network should be designed so that a 35 IRE edge will result in a ½ VCC pulse which will cross the control threshold. This will guarantee that a proper 40 IRE edge will always generate a sample and a low 30 IRE noise edge will not generate a sample.

Similarly, after inversion twice by inverter I2 and I3, the output of CP6 is differentiated by a differential capacitor C5 of 0.001 μf and a differential resistor R14 of 330Ω. The delay of the inverter I1–3 along with the delay of *sync tip clamp* 116 ensures that the sample pulses are applied to $SW_1$ and $SW_2$ well after any ringing or other distortion on the sync or blanking level has died out. If desired, delay elements other than the inherent delay of the circuit elements may be introduced to further ensure proper sampling of the video. Thus a differential pulse is coupled to switch $SW_2$. The differential pulses produced by C5 and R14 cause the switch $SW_2$ *to* close so that a resistor R16 of 1KΩ and a capacitor C7 of 0.1 μf hold the negative peaks of the synchronizing pulses. The two signals which operate sample [switch] *switches* $SW_1$ and $SW_2$ can be described as reference taking signals, since they take the instant samples which are in turn held by the hold capacitors to generate the voltage reference signals used by the divider 124 to provide references for comparator 122.

Figure 5:
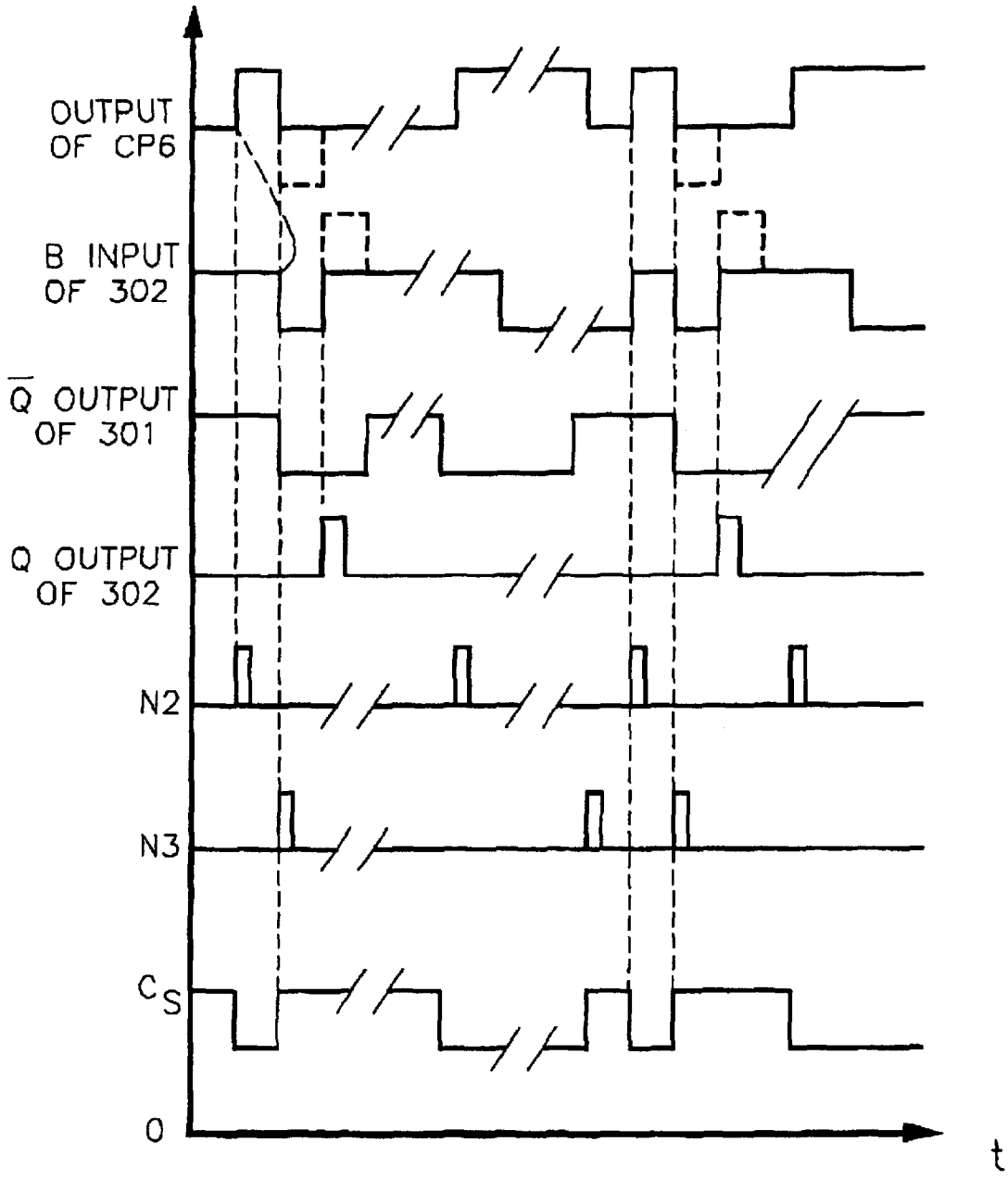
FIG. 5 shows waveform diagrams of several nodes of the synchronizing signal processing apparatus.

As a result, each of the pair of differential pulses produced by C4, R13, C5 and R14 defines the pulse position of respective synchronizing pulses. The relationship of the output pulses of CP6 and the differential pulses is shown in FIG. 5. Furthermore, buffers OP7 and OP8 deliver the peak sample signals to divider 124 for further processing.

Figure 3:
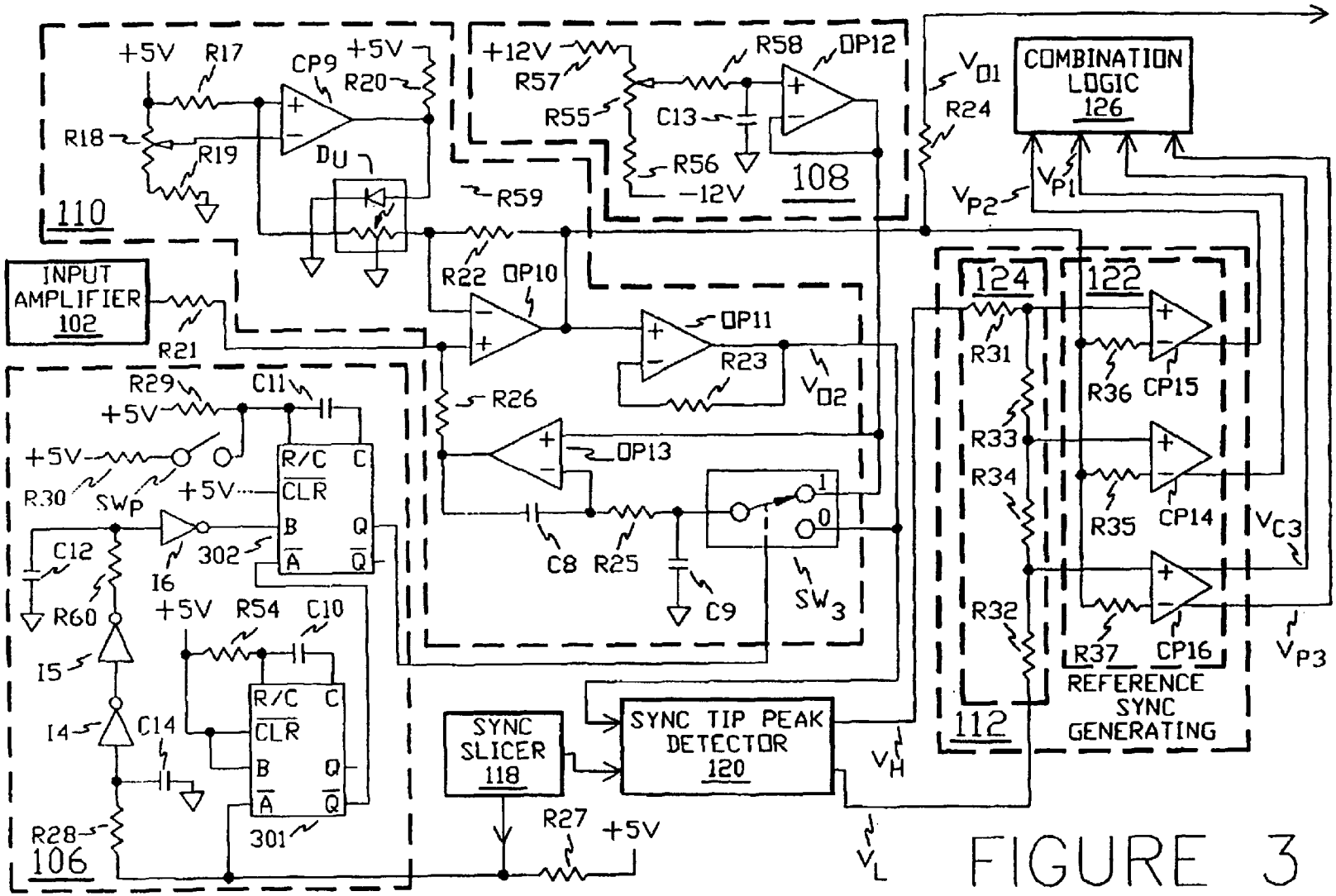
FIG. 3 illustrates a detailed circuit diagram including a pulse width adjust and a reference sync generating section of the synchronizing signal processing apparatus of FIG. 1.

The video signal amplified by the input amplifier 102 is also coupled to the DC restoration device 110, referring to FIG. 3. The DC restoration device 110 includes a voltage comparator CP9, a photosensitive element having a LED (light-emitting diode) [DU] $D_u$ and a photoresistor R59, as amplifier OP10 and *a* buffer OP11. A positive 5V DC voltage is tied to a resistor R17 of 1.0KΩ, the left part of the photoresistor R59 and the [top] *tap* of R59 is connected to ground. Thus, the voltage applied to the positive input of CP9 depends on the resistance of the left part of R59. On the other hand, the positive 5V is tied to a series connection of potentiometer R18 a resistor R19 and to ground. Thus, the reference voltage at the negative input of CP9 is defined by the position of the wiper of potentiometer R18. Therefore, adjusting the position of the wiper of potentiometer R18 may change the input voltage at the negative input of CP9.

At the output of CP9, a positive 5V is applied to the LED $D_u$ through a resistor R20 of 200Ω. The positive 5V provides an offset current to LED $D_u$. The light intensity of the LED $D_u$ is in proportion to the current flowing through it. The resistance of photoresistor R59 is inversely proportional to the light intensity. Therefore, the higher the output of CP9, the larger the current through the LED $D_u$, the lower the resistance of the photoresistor R59. The lower resistance of R59 makes the voltage applied to the positive input of CP9 go down, thereby causing the output of CP9 to decrease. CP9 thus causes R59 to maintain the voltage at the positive and negative inputs of CP9 to be equal.

The output of the input amplifier 102 is coupled to the positive input of the amplifier OP10 of DC restoration *device* 110, via a resistor [R2] *R21* of 330Ω. The output of OP10 is tied to the negative input via a feedback resistor R22, 1.0KΩ and the right part of the photoresistor R59 ties the negative input of OP10 to ground. Because the output of CP9 may change the resistance of R59, the gain of OP10 is also controlled by the output of CP9. Therefore, changing the position of the wiper of potentiometer R18 changes the gain of OP10. It will be understood from the present teachings that the same functions may be performed with other circuit elements, for example multipliers.

The output of OP10 is applied to the positive input of amplifier OP11. Along with a resistor R23 of 1.0KΩ, the operational amplifier OP11 buffers the output of OP10. The video signal from buffer OP11 is transferred to the sync tip peak detector 120 where the video signal is sampled in response to the pulses from the sync slicer 118, as shown in FIG. 2. The video signal output amplified by OP10 is also sent out by an output resistor R24, 71.5Ω for other purposes.

An offset device 108 is arranged to provide a DC offset required by the operational [amplified] *amplifier OP13* of the DC restoration *device* 110. The offset device 108 includes a resistor network having a resistor R57 (100KΩ), a resistor [R55] *R56* (100KΩ) and a potentiometer R55. A positive 12V is coupled to resistor R57 and a negative 12V is coupled to resistor R56. A voltage determined by the position of the wiper of potentiometer R55 charges a capacitor *C13* of 0.1 μf via a resistor R58 of 100KΩ. The level on the capacitor C13 is applied to the positive input of a buffer OP12.

The offset voltage is delivered to an integrator circuit established by a operational amplifier OP13 and a capacitor C8 (0.1 μf) bridging between the negative input and output of OP13. The positive input of OP13 receives the offset voltage. The offset voltage is also coupled to a switch $SW_3$. The common close status of $SW_3$ couples the offset voltage to the negative input of OP13 via a resistor R25 of 10KΩ. A capacitor C9 of 0.001 μf is tied between ground and $SW_3$ for filtering undesired frequency components and switching transients.

In accordance with the present invention, the pulse width adjust 106 is provided [for]. The pulse width adjust 106 includes two multivibrators 301 and 302. The output from the sync slicer 118 is coupled to the [/A] $\bar{A}$ input of 301, as shown in FIG. 3. A positive 5V is tied to the clear input Clr *and the B input* of 301. Responding to each falling edge of the sliced signal from sync slicer 118, the multivibrator 301 produces a low level pulse at the [Q] $\bar{Q}$ output of 301. The width of the low level pulse is set by a resistor R54 of 10KΩ and a capacitor C10 of 0.001 μf. The output from 301 is shown in FIG. 5.

The output from sync slicer 118 is also coupled to the B input of multivibrator 302 via a delay circuit. This delay circuit includes two RC filters. A capacitor C14 (51 pf) and a resistor R28 (10KΩ) form a RC filter and a capacitor C12 (56 pf) and a resistor R60 (2.5KΩ) provide another one. Two inverters I4 and I5 are arranged between the two RC filters. An inverters I6 is positioned between the B input of 302 and RC filter having C12 and R60. A positive 5V is applied to R28 via a resistor R27 (1KΩ) for providing a DC bias. This delay circuit delays the sliced signal from sync signal 118 about 0.75 μs to 0.9 μs.

The pulses at the [/Q] $\bar{Q}$ output of 301 trigger the multivibrator 302 via its [/A] $\bar{A}$ input so that the Q output of 302 is at high level. The delayed pulses by the delay circuit is applied to B input of 302, triggering it so that the Q output of 302 is at a high level. The pulse width of output pulse from 302 is set by a resistor R29 of 3.32KΩ and a capacitor C11 of 0.001 μf, if the apparatus 100 in accordance with the present invention operates under *a* conventional TV video signal mode, for example, the NTSC video signal. When the apparatus 100 operates under the HDTV mode, a resistor R30 of 1KΩ is shunted with R29 by closing of the switch [SWP] $SW_p$.

Therefore, the pulse width of Q output of 302 is between 2.0 μs and 2.5 μs for the NTSC video signal. This pulse occurs during blanking and burst portion of the NTSC video signal. On the other hand, the pulse width of the Q output of 302, for the HDTV video signal, is from 0.5 μs to 0.7 μs. The pulse of Q output of 302 coincides with the blanking portion without exceeding it. The waveform at the Q output of 302 is shown in FIG. 5.

The output pulses at the Q output of 302 activate the $SW_3$ so that the output from OP11 is coupled to the negative input of OP13 via the RC filter having the resistor R25 and the capacitor C9. During the high level of the pulses from 302, the capacitor C8 of the integrator OP13 is charged up and down by the video signal from the buffer OP11 depending on whether it is above or below the reference on the plus input of OP13, drawing the input voltage at the positive input of OP10 up or down. As a result, the output of OP10 is drawn up or down. After the Q output of 302 recovers to low level, the switch $SW_3$ is released so that the negative input of the operational amplifier OP13 is coupled to the output of OP12 of the offset device 108. Thus, the output of the operational amplifier OP13 does not change.

The divider 124 of the reference sync generating section 112 includes four resistors R31, R32, R33 and R34. The resistors R31–R34 have the same resistance of 10KΩ. Therefore, the output potential of the sync tip peak detector 120 is equally divided so that three reference potentials are provided. The first reference potential between the resistors R33 and R34 equals half of the output potential from the sync tip peak detector 120. The second reference potential between the resistors R31 and R33 equals three-fourth of the output level from the sync tip peak detector 120. The third reference potential between the resistors R32 and R34 equals one-fourth of the output level from the sync tip peak detector 120. However, different reference potentials may also be obtained by changing the resistance of resistors R31–R34. Different combination of potentials on the positive input of CP14–CP16 can be easily realized.

In accordance with the present invention, the comparator 122 of reference sync generating section 112 includes three comparators CP14, CP15 and CP16. The first reference potential between the resistors R33 and R34 is applied to the positive input of comparator CP14. The second reference potential between the resistors R31 and R33 is applied to the positive input of the comparator CP15. The third reference potential is then applied to the positive input of the comparator CP16. The video signal output [V0$_1$] $V_{01}$ from the amplifier OP10 of the DC restoration *device* 110 is coupled to respective negative inputs of three comparators CP14–CP16 via resistors R35, R36 and R37.

As for conventional TV video signals, for example, the NTSC video signal, CP14 compares the first reference potential and the video signal $V_{O1}$ so as to sense the middle levels of the horizontal and vertical synchronizing pulses. The comparator CP15 then senses the video signal $V_{O1}$ in response to the second reference potential and the rest of the video signal $V_{O1}$ is regarded as noise. Because the switch $SW_1$ of sync tip peak detector 120 closes during the blanking-burst period to sample the video signal, the second reference potential is set to a level lower than the blanking level. The switch $SW_2$ of sync tip peak detector 120 closes during the negative synchronizing tip to sample the video signal, the third reference potential is thus set to a level higher than the negative tip. Two complementary output $V_{P3}$ and $V_{C3}$ from CP16 are delivered to the combination logic 126.

As a second example, when the apparatus 100 in accordance with the present invention is used for processing the HDTV video signal, the second reference potential represents a value between the blanking and positive peak synchronizing tip for the synchronizing pulses. The rest of the video signal $V_{O1}$ is considered as noise. The first reference potential is set at the middle of the negative and positive synchronizing tip during synchronizing pulses, meaning at the blanking level. The purpose of this comparator CP14 is to sense transition from the negative synchronizing tip to the positive synchronizing tip. The rest of the video signal $V_{O1}$ is considered as noise. The reference potential and the output $V_{P3}$ of CP16 is the same as under the NTSC video signal. Therefore, outputs of comparator 122 are logic levels corresponding to the negative sync for these video signals.

Figure 4:
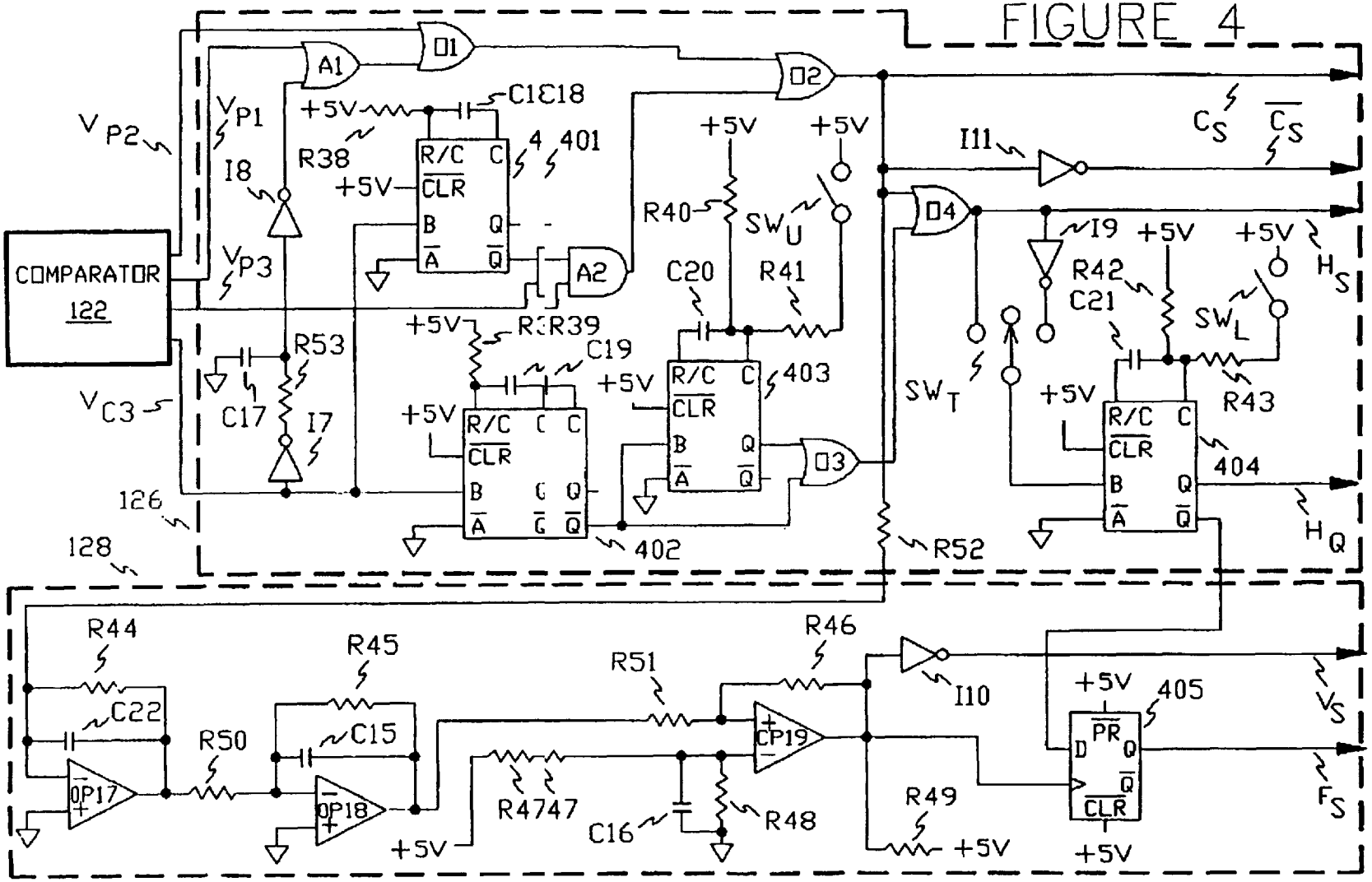
FIG. 4 illustrates a detailed circuit diagram of a sync restoring section of the synchronizing signal processing apparatus of FIG. 1.

The logic level outputs $V_{P1}$, $V_{P2}$, $V_{P3}$ and $V_{C3}$ from the comparator 122 are directed to the combination logic 126 of the sync restoring section 114, as shown in FIG. 4. The output $V_{P1}$ of the comparator CP14 is directed to an input of an AND gate A1. The signal $V_{C3}$ output from the comparator CP16 is inverted by an inverter I7, and is filtered by a RC filer having a resistor R53 (200Ω) and a capacitor C17 (0.001 μf). Before it is applied to another input of the AND gate A1, the filter signal $V_{C3}$ is inverted again by an inverter I8. In order to preserve the combination logic generated sync information at the half way crossing, the output $V_{C3}$ from the comparator CP16 is delayed by the inverter I7 and I8 circuit for 85 ns–200 ns. Thus, the two input pulses are added at the inputs of the AND gate A1 so that the output of A1 is a positive pulse.

Along with the output from the AND gate A1, the output $V_{P2}$ from the comparator CP15 is directed to an input of an OR gate O1. The positive pulse from A1 and the $V_{P2}$ activate the OR gate O1, thereby producing a pulse which has a rising edge defined by the positive pulse from A1 and a falling edge defined by $V_{P2}$. The output of OR gate O1 is directed to another OR gate O2.

The output $V_{C3}$ is also used to trigger a multivibrator 401 so that a high level is set at the [/Q] $\bar{Q}$ output of the multivibrator 401. The width of *the* high level is set by a resistor R38 and a capacitor [C8] *C18*. In this case [o1], *where* capacitor C18 has a capacitance of 0.001 μf and resistor R38 has a resistance of 2.9KΩ, the pulse width is between 1.4 μs–2.8 μs. The output high level at the [/Q] $\bar{Q}$ output of 401 is directed to an input of an AND gate A2. Another input of A2 receives the output $V_{P3}$ from the comparator CP16. For the NTSC video signal, the output of A2 is determined by signal $V_{P3}$. Under the HDTV video signal, the output of A2 is determined by the pulse at the [/Q] $\bar{Q}$ output of 401. The minimum width for this pulse is 2.6 μs which *is* determined by the duration of the vertical interval pulses. The maximum width for this pulse is 2.8 μs which is determined by the duration of the blanking in horizontal lines.

The ANDed output from A2 is applied to another input of OR gate O2 so that the output from OR gate O1 is ORed with the ANDed output from A2. Particularly, under processing the NTSC video signal, the ORed output of OR gate O1 is completely determined by the ANDed output pulse from A2. The reason is that the negative ANDed output from A2 is narrower than the negative ORed output from O1. The output of O2 is a composite synchronizing output $C_S$.

In order to extract horizontal synchronizing pulses from the [out] *output* $C_S$ from the OR gate O2, [a] circuitry including multivibrators 402 and 403, and OR gates O3 and O4 is designed. This circuitry eliminates every second half horizontal pulse from the vertical interval. The signal $V_{C3}$ output from the comparator CP16 is directed to the multivibrator 402, where $V_{C3}$ triggers the B input of 402 to set a low level at its [/Q] $\bar{Q}$ output. The width of this low level is set by a capacitor C19 (0.001 μf) and a resistor R39 (11.3KΩ). In this case, the low level lasts 6–10 μs. The 6 μs lower time limit is chosen to be greater than the horizontal synchronizing pulse duration. The upper time limit is chosen so that the pulse will not get into active video signal.

The [/Q] $\bar{Q}$ output of 402 triggers the B input of the multivibrator 403 so as to set a high level output at its Q output. The duration of the high level at the Q output of 403 is determined by a capacitor C20 (0.001 μf) and the combination of resistors R40 (68KΩ) and R41 (50KΩ). The position of switch $SW_U$ is determined by the operation mode. For example, under the NTSC video signal, $SW_U$ is open so that the duration of the high level at the Q output of 403 is set by R40 and [C12] *C20*, for example 35 μs–50 μs. On the other hand, if the apparatus 100 of the present invention is for processing the HDTV video signal, the switch $SW_U$ is closed so the R41 is shunted across R40. Accordingly, the duration of the high level at the Q output of 403 is determined by C20 and shunted resistors R40 and R41, for example 17 μs–20 μs.

The Q output of 403, along the [/Q] $\bar{Q}$ output of 402, is coupled to inputs of an OR gate O3. The output of OR gate O3 is the OR of the outputs of the multivibrators 402 and 403. This output of O3 coincides with the synchronizing tip but lasts a little longer. The output of [03] *O3* is directed to an OR gate O4. Another input of the OR gate O4 receives the output from OR gate O2. The OR gate 04 serves to eliminate the half horizontal pulses during the vertical intervals, thereby producing a horizontal synchronizing output $H_S$.

A multivibrator 404 is used to generate a horizontal square waveform output $H_Q$. The output $H_S$ of the OR gate O4 is coupled to the B input of 404 via the switch $SW_T$. When the apparatus 100 of the present invention operates under the HDTV video signal, the rising edges of output $H_S$ triggers 404 at the B input to set a high level output at its Q output. Meanwhile, the switch $SW_L$ is closed so that the positive 5V is applied to 404 via shunted resistors R42 and R43 and a capacitor C21. Accordingly, the duration of the high level depends on a capacitor C21 and the resistance of shunted resistors R42 and R43. If the capacitance of C21 is set as 0.001 μf and R42 and R43 are respectively set as 51KΩ, the duration is then 15 μs.

If the apparatus 100 of the present invention operates with NTSC video signal, the output $H_S$ is reversed by an inverter I9 so that the B input of 404 is triggered by the falling edges of the synchronizing pulse, setting a high level at its Q output. At the same time, the switch $SW_L$ is open so that the positive 5V voltage is applied to 404 via only a resistor R42. Assuming R42 has the resistance of 51KΩ and C21 has the capacitance of 0.001 μf, the duration of the high level of the Q output of 404 is 30 μs.

Figure 11:
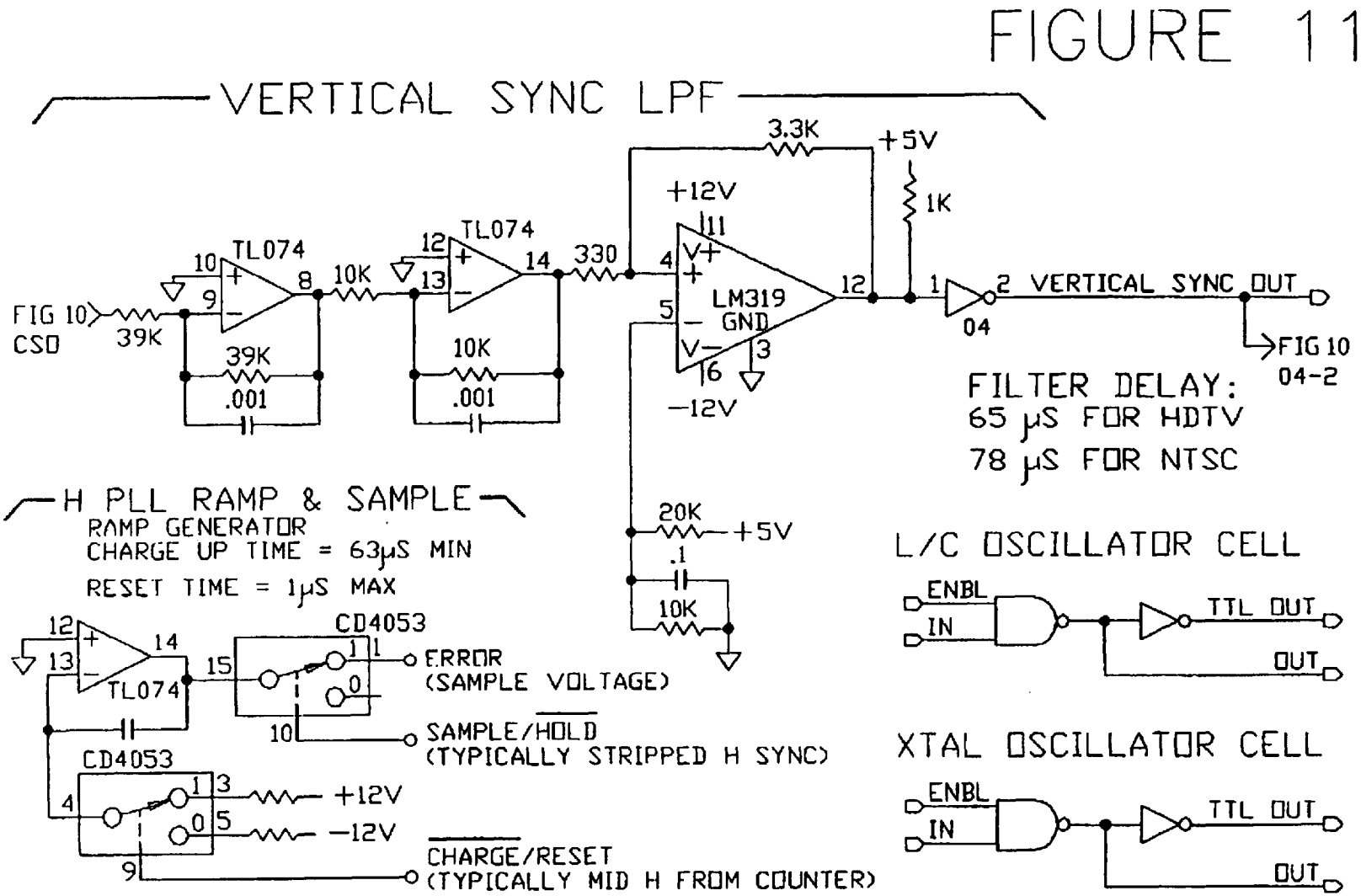

The output $C_S$ of OR gate 02 is also directed to a vertical synchronizing filter circuitry including operational amplifiers OP17 and OP18. A resistor R44 of 37.4KΩ and a capacitor C22 of 0.001 μf bridge across the output and negative input of OP17 to form a first stage integrator type low pass filter. The positive input of OP17 is tied to ground. The composite synchronizing output $C_S$ is coupled to the negative input of OP17 via a resistor R52 of 39KΩ. This configuration acts as a current source and leaky integrator such that the integrator is charged by the vertical broad pulses. The output from OP17 is coupled to the negative input of OP18 via a 10KΩ resistor R50. The positive input of OP18 is tied to ground. A resistor R45 (10KΩ) and a capacitor C15 (0.001 μf) are shunted across the negative input and the output of OP18, thereby providing a second stage integrator type low pass filter. Of course, a more traditional low pass filter circuit may be implemented by the addition of source resistors as shown in FIG. 11.

Figure 6:
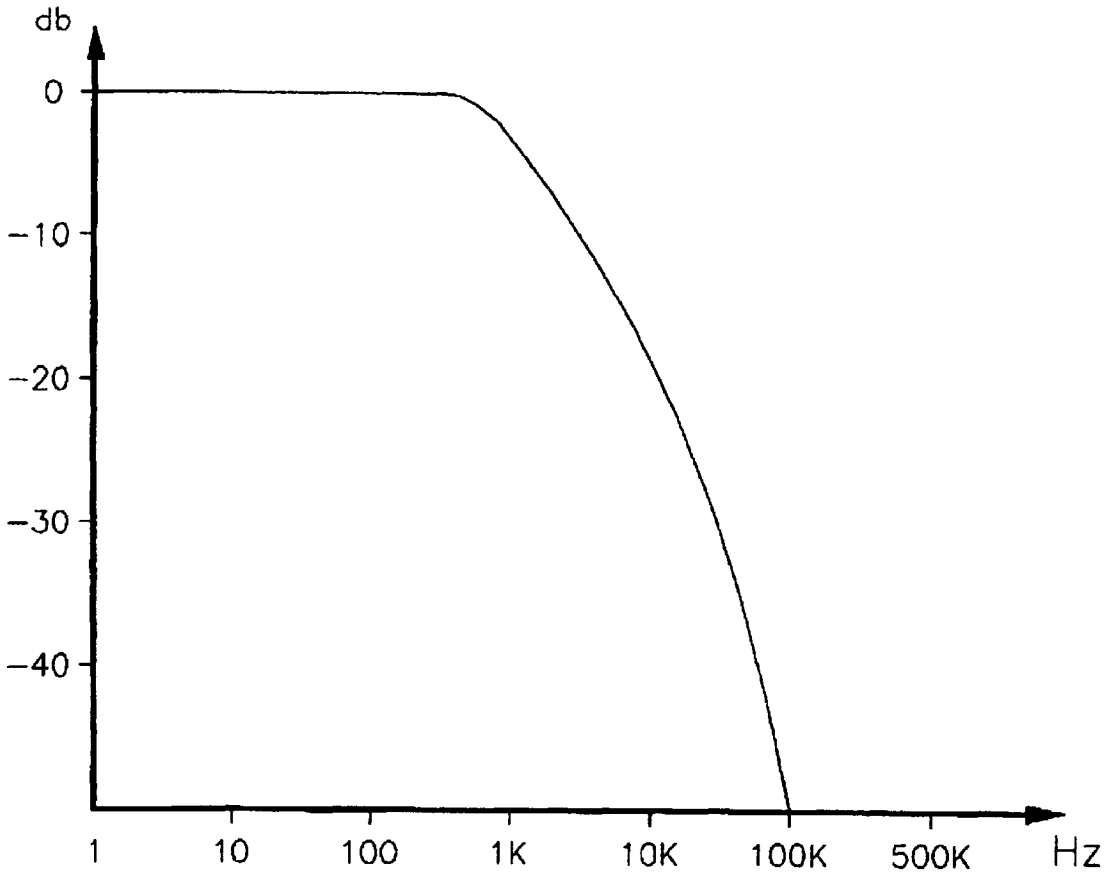
FIG. 6 shows a frequency response characteristic of a filter device of the synchronizing processing apparatus of FIG. 1.

This vertical filter circuitry employs a design which is an integrator and current source type, offsetting conventional optimal design. This design provides a frequency response characteristic without matching standard filter design curves which are commonly known. However, it is this design that provides a frequency response characteristic good for vertical synchronizing separation of the NTSC or HDTV video signal. This frequency response of the filter circuitry is shown in FIG. 6.

Alternatively, other vertical separation circuits which utilize the duty cycle of the vertical sync pulse may be utilized as well.

The filter signal is applied to a positive input of a comparator CP19 via a 38KΩ resistor R51. A resistor R46 of 3.3KΩ is bridged between the positive input and output of CP19 to provide positive feedback hysteresis for CP19. A positive 5V voltage is tied to ground via resistors R47 and R48. R47 has resistance of 20KΩ and R48 has resistance of 10KΩ. A capacitor C16 of 0.1 μf is shunted across resistor R48, thereby providing a stable reference voltage to the negative input of CP19. Furthermore, a positive 5V voltage is applied to the output of CP19 via a resistor R49 (1KΩ). Filter circuitry provides a vertical synchronizing output $V_S$ via CP19 and inverted by an inverter I10.

To obtain a field synchronizing output, the vertical synchronizing output from CP19 is directed to a flip-flop 405. The clear input [CLR] $\overline{CLR}$ and set input [PR] $\overline{PR}$ of 405 are coupled to a positive 5V. The CK input of 405 receives vertical sync and the D input of 405 is coupled to H sync square wave the [/Q] $\bar{Q}$ output of multivibrator 404. The rising edges of the $V_S$ pulses activate the trigger 405 to produce the field synchronizing output $F_S$. Upon arrival of the rising edges, the Q output of 405 is set to a level the same as that as its D input. In addition, an inverter I11 is provided for outputting a reversed composite synchronizing output [$C_S$] $\overline{C_S}$.

Figure 7:
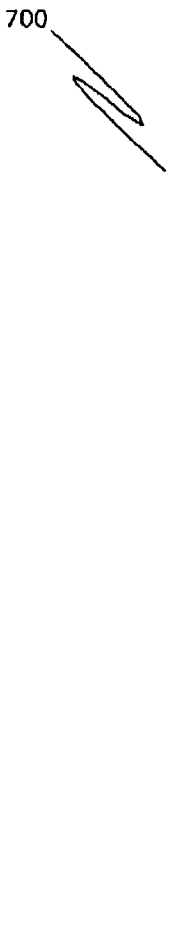
FIG. 7 is a flow chart of a synchronizing signal processing method in accordance with the present invention.
Figure 8:
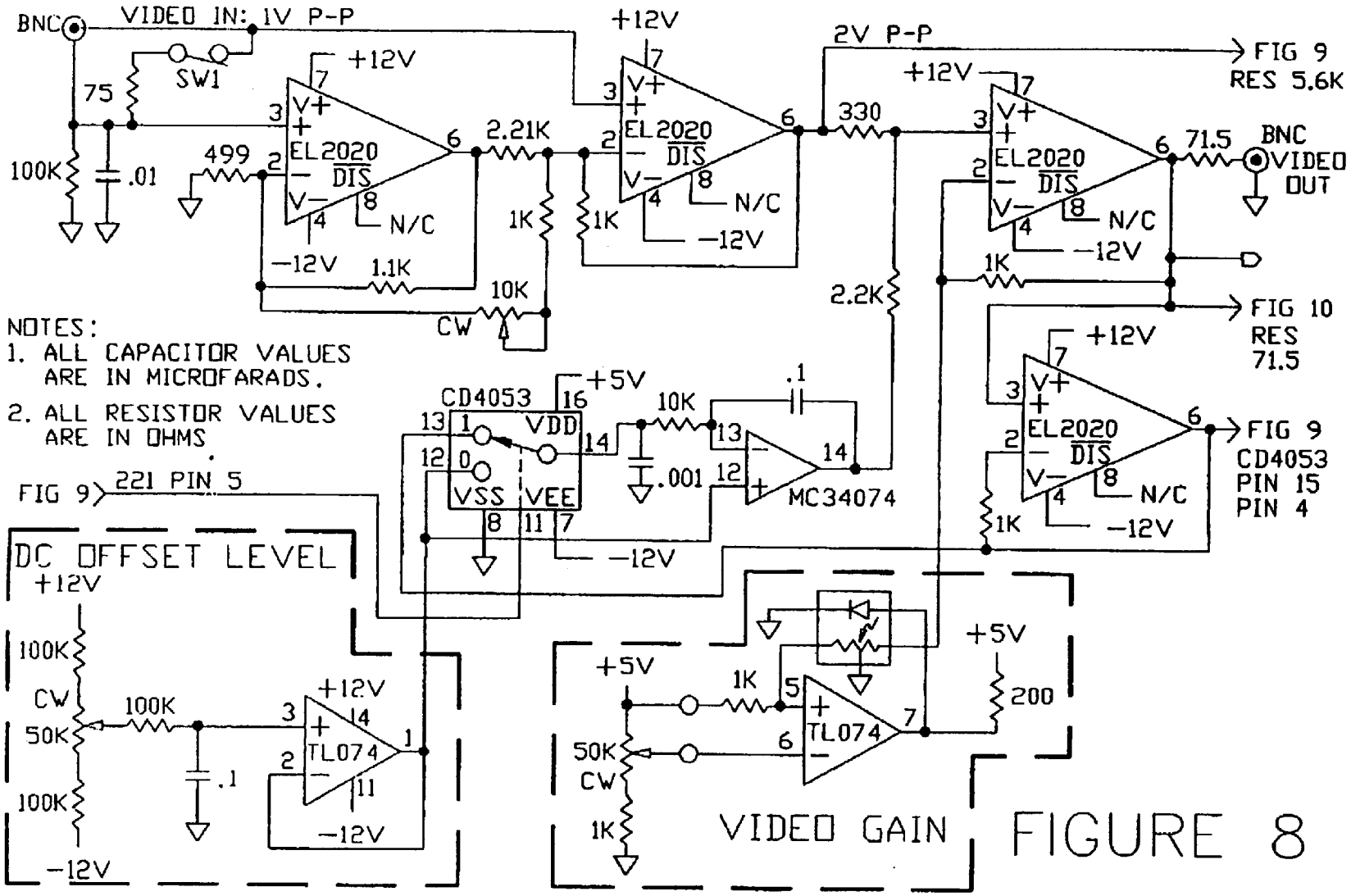
FIGS. 8–11 are four sheets of a detailed schematic of the preferred embodiment in accordance with the present invention.

A processing method 700 for synchronizing pulses of the video signals is shown in FIG. 7. At step 701, the video signal is sliced to produce synchronizing pulses. The video signal is then sampled in response to the sliced sync to precisely sense the sync tip peaks pulses, at step 702, thereby providing two peak signal values representing the positive and negative peak values of each synchronizing pulse.

The peak signal values are further converted, at step 703, into three reference signals which respectively represent the different levels relative to each synchronizing pulse. In particular, the three reference levels respectively represent the middle, upper and lower middle levels of the synchronizing pulse. Comparison of the three reference levels and the video signal is conducted at step 704. As a result of this comparison, the logic pulse outputs are obtained. Step 705 is for restoring synchronizing pulses of the video signal by combining the logic outputs.

FIGS. 8–11 show a more detailed schematic circuit of a preferred embodiment in accordance with the present invention. All of the components in FIGS. 8–11 correspond directly to those presented in FIGS. 2–4. The differences between FIGS. 2–4 and 8–11 include that all of components in FIGS. 8–11 are marked with commercial identification and are therefore more available in market. Therefore, detailed product part numbers and nominal values of components are marked on the components of FIGS. 8–11. The operation principle and interconnection of the components of the circuitry shown in FIGS. 8–11 are corresponding to FIG. 1 and FIGS. 2–4 and one skilled in the art will be able to understand FIGS. 8–11 from the forgoing description and explanation. Thus, the description of FIGS. 8–11 is omitted here.

Figure 12:
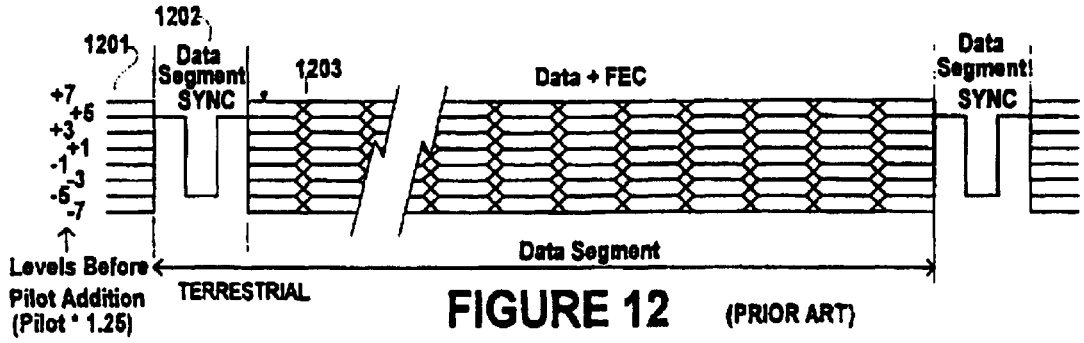
FIGURE 12 (PRIOR ART)
FIG. 12 shows a prior art HDTV video format waveform which has a two level sync pulse and an 8 level digital data format.

FIG. 12 shows a prior art HDTV video format waveform which utilizes a two level sync pulse and an 8 level digital data format. The Data+FEC (Forward Error Correction) 1203 is carried in analog form constrained to a number of discrete levels which levels are allowed to change periodically, most usually in response to a clock signal. It may be noted that the sync pulse in this signal is not the same type of sync pulse as formed in typical NTSC or similar prior art systems. The sync pulses in NTSC type systems are used to facilitate horizontal and vertical scanning of the electron beam of the TV display whereas the sync pulses of the present system of FIG. 12 are used to facilitate the location and subsequent recovery of the data segment. It will be appreciated from the present disclosure that the invention described herein may be used to advantage with any type of synchronizing, locating or identifying pulse or arrangement of a known pattern or sequence.

The use of the analog constrained level type of data transmission for video signals was described for example in U.S. Pat. No. 4,665,431 issued May 12, 1987. In the '431 patent such a system is seen in FIGS. 2 and 3 where the constrained data carries audio or other related signals in the video waveform.

The waveform of FIG. 12 is typical of the HDTV terrestrial broadcast transmission system which is proposed for the United States. Note that the 8 possible levels which the data may take on are shown simultaneously, as if the figure were an oscilloscope display repetitively triggered to the sync pulse. In normal operation where only a single one of a data segment is displayed the data will be seen to trace a single pattern among the various levels, such as shown in FIGS. 2 and 3 of the prior art '431 patent.

Figure 13:
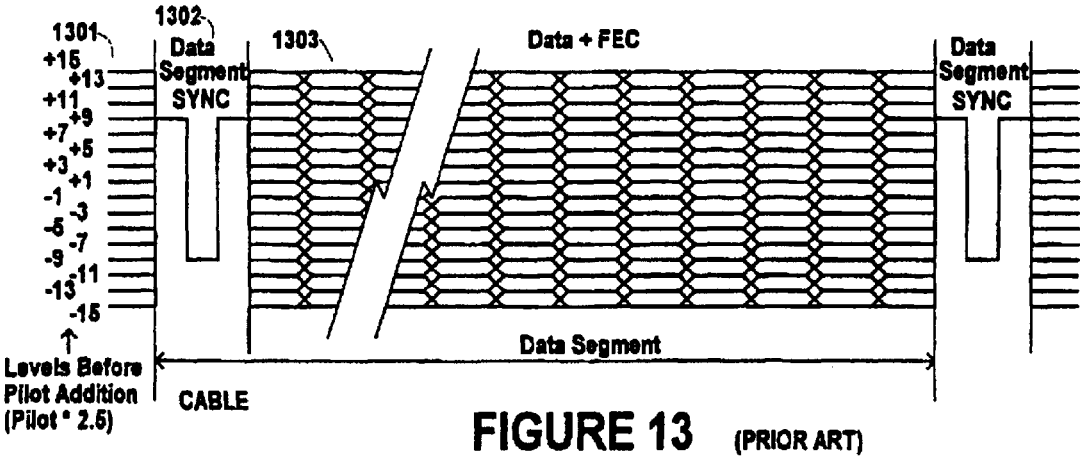
FIGURE 13 (PRIOR ART)
FIG. 13 shows a prior art HDTV video format which utilizes a two level sync pulse and a 16 level digital data format.

FIG. 13 shows a prior art HDTV video format which utilizes a two level sync pulse and a 16 level digital data format. This waveform is typical of the terrestrial HDTV cable TV transmission system which is proposed for the United States. It will be understood that the combination of analog constrained level data and two level sync pulses as shown in FIGS. 12 and 13 is provided herein as examples of prior art video type signals with which the present invention may be used to facilitate improved synchronizing pulse separation, however the invention is not intended to be limited to only these two examples and may be utilized to advantage with any other system which utilizes two or more level synchronizing or identifying type pulses with analog or digital information carried therewith.

For the video signals of both FIG. 12 and 13, it is preferred to establish a known D.C. reference level for the signal and to provide data reference levels with which the particular level that a data bit occupies may be determined. Alternatively, it is possible to measure the D.C. level of the video type signal and adjust the reference levels accordingly. As the video type signal level changes the data reference levels will change in response thereto in order to maintain the proper relationship. It will be recognized that establishing a proper reference level is preferred to be accomplished by use of known components of the synchronizing portion of the signal, such as a sync tip or a sync blanking level. The use of the sync components is preferred, since those are the best known and most easily identified levels of the signal by virtue of the defined arrangement and known pattern of the waveform the pattern having a repetitive nature. It will also be recognized that for the signal of FIGS. 12 and 13 establishing proper reference levels is best performed by using both the sync tip and sync blanking level. The function of determining which particular level that a data bit occupies will be referred to herein as slicing and may be determined by establishing data reference levels to which the data waveform or signal may be compared by multiple comparators, although the term slicing as used herein will be used to encompass all circuits, steps and functions for performing this task of determining which data reference levels a data bit falls between or matches.

As an example, with respect to FIG. 12 it is seen that there are 8 possible data levels identified on the left scale as occurring at levels labeled −7, −5, −3, −1, +1, +3, +5, and +7. In order to identify which of these eight levels the video signal occupies at a particular time it can be seen that establishing data reference levels between the video levels, and comparing the video to those reference levels is desired. For the present example it can be seen that the reference levels may be established at −6, −4, −2, 0, +2, +4, and +6. In addition it may be desired to detect that video has exceeded the allowable range by adding thresholds of −8 and +8. The capability of such detection will allow data to be flagged as suspect for example in the event of noise impulses. The establishment of such reference levels is often complicated by the fact that the areas of information between sync pulses may very well change in amplitude and D.C. offset level during the segment.

In order to overcome this problem it is necessary to first establish or measure some known parameter at each end of the segment in order to be able to estimate the change during the segment. This process first requires identifying the segment by identifying or detecting the arrangement or sequence of the known occurrences or patterns of the sync or other identifier. The present invention provides for such identification by locating or detecting a first transition of a known direction and amplitude, and inspecting the first transition to see if it occurs in a proper relation to a second known occurrence. The second known occurrence may be another transition of a known direction and level, or the occurrence of a known level for a known time. The detection of the proper relation of the known occurrences is preferred to be made by delaying a signal marking the first occurrence for an amount equal to the expected arrival of the second occurrence and determining if the two are approximately coincident, thereby indicating the proper relationship. Further inspection may be made by including a third or more occurrences in the inspection to ensure proper relationships.

Once the locations of segments of video, data or other information are known by the above determination of the locations of arrangements of known patterns of identifiers, the levels of known parts of the patterns may be utilized to establish the levels of one or more references at the start and end of the segments. Once the start and end levels are known the references may be adjusted throughout the segment in order to facilitate recovery of the information for example by data slicing.

Figure 14:
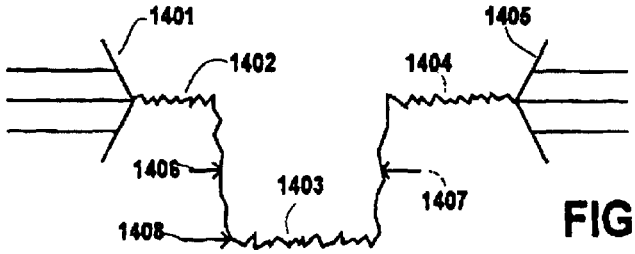
FIG. 14 shows an expanded diagram of a typical one of the syncs of FIG. 12 or 13.
Figure 15:
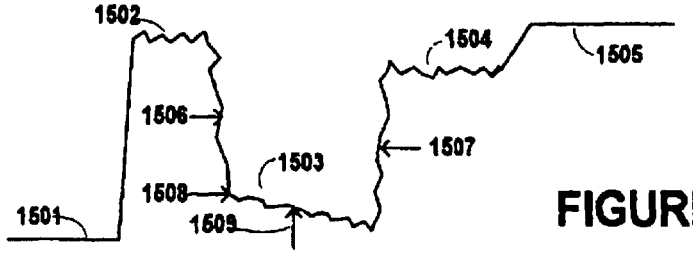
FIG. 15 shows a typical expanded diagram of a typical pair of single data segments separated by a single sync pulse.

FIG. 14 shows an expanded diagram of a typical one of the syncs of FIG. 12 or 13, showing data segment ending data 1401, leading sync blanking 1402, sync falling or leading edge 1406, sync tip 1403 with sync tip level 1408, sync rising or trailing edge 1407, sync trailing blanking 1404 and data segment beginning data 1405. Note in particular that the 50% level of the sync pulse is identified for each of the leading and trailing edge by 1406 and 1407 respectively. It may also be noted that the sync pulse is corrupted by the presence of residual carrier pilot and other interference shown as the broadening of the waveform. FIG. 15 shows a typical expanded diagram of a typical pair of single data segments separated by a single sync pulse. FIG. 15 shows the first data segment ending data 1501 which happens to occur at the lowest level, leading sync blanking 1502, sync falling or leading edge 1506, sync tip 1503 with leading sync tip level 1508 and average sync tip level 1509, sync rising or trailing edge 1507, sync trailing blanking 1504 and the second data segment beginning data 1505 which happens to occur at the highest level. Note in particular that the 50% level of the sync pulse is identified for each of the leading and trailing edge by 1506 and 1507 respectively, and that they are not the same level as shown in FIG. 14. It may also be noted that the sync pulse of FIG. 15 is also corrupted by the presence of residual carrier pilot and other interference shown as the broadening of the waveform. The presence of the residual carrier pilot is of particular concern since if not properly accounted for it can upset the measurement of sync blanking and tip. It is desired that any sample and hold which is utilized to sample the level of a sync component have a sample period which is an integral multiple of cycles of this carrier in order that the effect of the carrier will be integrated out by the hold circuit. Alternatively, filtering of the sync component may be utilized.

It may be noted that the waveform of FIG. 15 is corrupted in a relatively low frequency manner, which is demonstrated for purposes of example by the tilt in the sync tip and the associated different levels of 1502 and 1504, and also 1506 and 1507. It will also be recognized that the amplitude of the overall waveform may be affected such as to change the overall amplitude, or to compress or expand portions of the amplitude in a nonlinear fashion. All of these various distortions may be experiences simultaneously in a static or time varying fashion.

Tilt will be used herein to signify any type of distortion of the video signal whereby the position of sync components and/or data components are disturbed within a single sync period or from period to period. This distortion may be caused for example by capacitive coupling of the video waveforms with the resulting average level which changes due to the data in the different data segments being at different levels. Other causes of distortion may include interference from unwanted signals being introduced into the video signal, or reflections of the signal itself from terrestrial objects or imperfect transmission either over the air, in the cable system or in the video transmitting, receiving or processing circuitry.

In establishing the reference levels for subsequent slicing of the data, it will be necessary to either first remove the tilt from the waveform, or to generate reference levels having the same tilt as the waveform. It is preferred to remove the tilt by clamping the waveform to a known D.C. level and to generate the required reference values in response to the amplitude of the sync pulse. It is further preferred to adjust the amplitude of individual ones of the reference values in response to the data itself in order to optimally place said reference values between the data levels. In this fashion the reception of the transmitted data of the video signal may be optimized.

Figure 16:
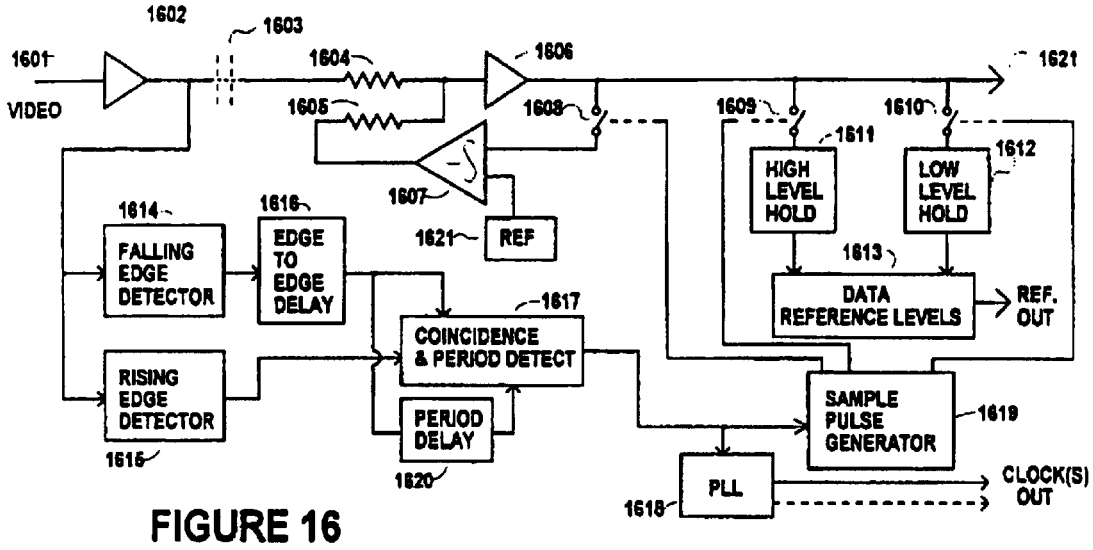
FIG. 16 shows a diagram of the preferred embodiment of the present invention

FIG. 16 shows a diagram of the preferred embodiment of the present invention having a video input 1601 for receiving the video type signal, a processing circuit 1602 for receiving and processing the video type signal. Circuit 1602 is preferred to include common mode rejection capability and filtering to remove unwanted interference signals which are of a fixed frequency nature. The output of 1602 is coupled to a falling edge detector 1614 to a rising edge detector 1615, and to a D.C. level adjustment circuit shown in this preferred embodiment as a resistor network 1604 and 1605. It will be recognized that the output of 1602, as well as any other of the signals at any other stage utilized in the invention, may be coupled in any fashion known to those of ordinary skill in the art, including capacitively coupled as shown by 1603.

The falling edge detector 1614 operates to detect when a falling edge is present in the signal, such as the edge 1506 of FIG. 15. The output of the falling edge detector may be considered a marking signal and the marking signal is delayed by an edge to edge delay 1616 where the delay is slightly shorter than the time period or number of clocks from the leading edge 1506 to the trailing edge 1507. The rising edge detector 1615 operates to detect when a rising edge is present in the signal, such as the edge 1506 of FIG. 15. It will be recognized that by the addition of a window level comparator to the coincidence detect 1617 that the presence and duration of a particular level of the sync signal may be detected. The detection of the duration of the sync tip 1503 is described above, and if the window detector is combined to verify that the level of sync tip is between two known levels then the level and duration of sync tip may be detected. Such detection is also possible for other levels such as the sync blanking level 1502 or 1504.

It will thus be appreciated that events of transitions of known direction and amount as well as events of levels of known amount and time may be detected as well as the relationships of the events, including the sequence and timing of such events may be detected and utilized to detect or verify the occurrence of sync or other types of timing signals in the video type signal.

Figure 20:
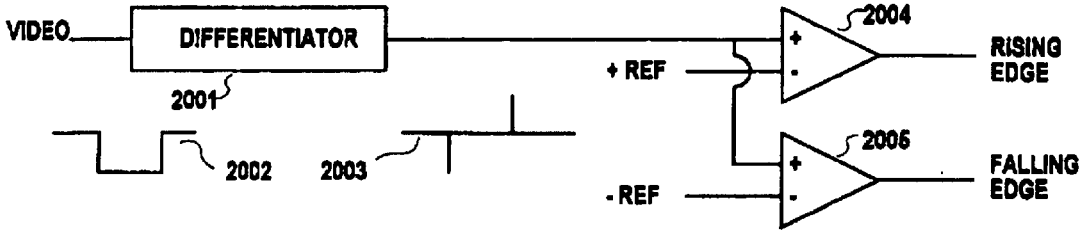
FIG. 20 shows a diagram of the preferred embodiment of the present invention for detecting edges of known magnitude.

The edge detectors are preferred to take into account the distance the edge falls or rises such as by differentiating the edge to generate a spike, and comparing the amplitude of the spike to a reference such that edges which occur due to data transitions from one level to another which are smaller than the distance from sync pulse blanking 1502 to sync tip 1508 may be discarded. Thus only edge transitions equal to or greater than the substantial amplitude of sync edges are detected. Such an edge detector is implemented in 120 of FIG. 2 as previously described and is also shown in FIG. 20.

As previously mentioned the delay 1616 delays the leading sync pulse by slightly less than the expected period of a legitimate sync pulse. The coincidence and period detector 1617 then checks to see if a leading pulse is followed at substantially the proper time or number of clocks by a trailing pulse. If so, the period detector then checks to see if this set of pulses occurred at the proper time or number of clocks after the preceding received set of pulses, which preceding set is delayed by period delay 1620. In other words, 1617 checks for proper sync pulse width and period. It will be recognized that the detection of periods and delays may be performed by the use of time delays or clock period delays as one skilled in the art will be able to choose to fit a particular implementation of the invention without departing from the scope of the invention. In particular, the delays may be implemented with clock counters in order that they track transmission rate variations of the video type signal.

It is preferred that 1617 utilize some amount of windowing in checking for proper sync pulse period and width in order to allow for small variations which may occur to legitimate syncs due to noise, time base errors, transmission imperfections and the like. This is the reason that delay 1616 is preferred to delay an amount slightly less than the width of a sync pulse and detect as proper pulses which arrive between that time and a time slightly more than that of a proper sync pulse. In particular it is preferred that both the pulse width and pulse period detectors operate to detect within a window of 95% to 105% of the expected value.

While the pulse period delay is shown as being separately connected to 1616 to represent that it presents the previously detected pulse from 1616 and presents it to 1617 after a delay, it will be recognized that it may also be connected to the output of 1617. The former case will allow quicker startup and acquisition and the latter will provide better noise immunity since any pulse out of 1617 will need to have been preceded by a pulse which occurred a pulse period earlier. It will be recognized however that if there is never a pulse out of 1617 upon initial startup, that there will never be a pulse from 1620, thus causing 1617 to latch up. This condition must be detected and prevented. For example, 1620 can be connected to 1616 if there is no previous output from 1617 stored in 1620, and then connected to 1617 as soon as there is an output from 1617. This function may be performed by a simple retriggerable oneshot which sets when a pulse is received from 1617 and times out if no pulse is received after 1½ pulse periods. As long as the oneshot is triggered, the output of 1617 is used to feed 1620. If the oneshot times out the output of 1616 feeds 1620.

The output of 1617 is coupled to a sample pulse generator and PLL 1618. The PLL is utilized to provide sample clocks and other clocking signals for subsequently sampling and clocking the data from the video signal, and for other clocking and timing functions as will be apparent to one of ordinary skill in the art. The sample pulse generator 1619 operates to provide properly times sample signals to the various sample and hold circuits to take samples of the video signal level at known times, for example to the sample switches 1608, 1609 and 1610 to take samples of the sync pulse blanking levels 1502 and 1504 with switch 1608, the high reference level which in the preferred embodiment is also 1502 and 1504 with switch 1609, and sync tip level 1509 with switch 1610. Other sample signals may be provided as well as will be discussed below.

Sample switch 1608 along with reference 1621, negative integrator 1607 and current providing resistor 1605 operate to D.C. restore the video signal the same as that of circuit 110. While not shown in FIG. 16, it will be recognized that any of the additional functions provided in FIG. 1 may also be included in the circuit of FIG. 16 as desired.

Sample switches 1609 and 1610 operate in conjunction with high and low level hold circuits 1611 and 1612, respectively, to sample and hold the levels of the sync pulse. In that the level of the sync pulse is directly related to the levels of the reference between each of the data levels of the data segment, the data reference level circuit 1613 receives the levels from 1611 and 1612 in order to establish reference levels for data slicing, as shown in FIG. 17.

Figure 17:
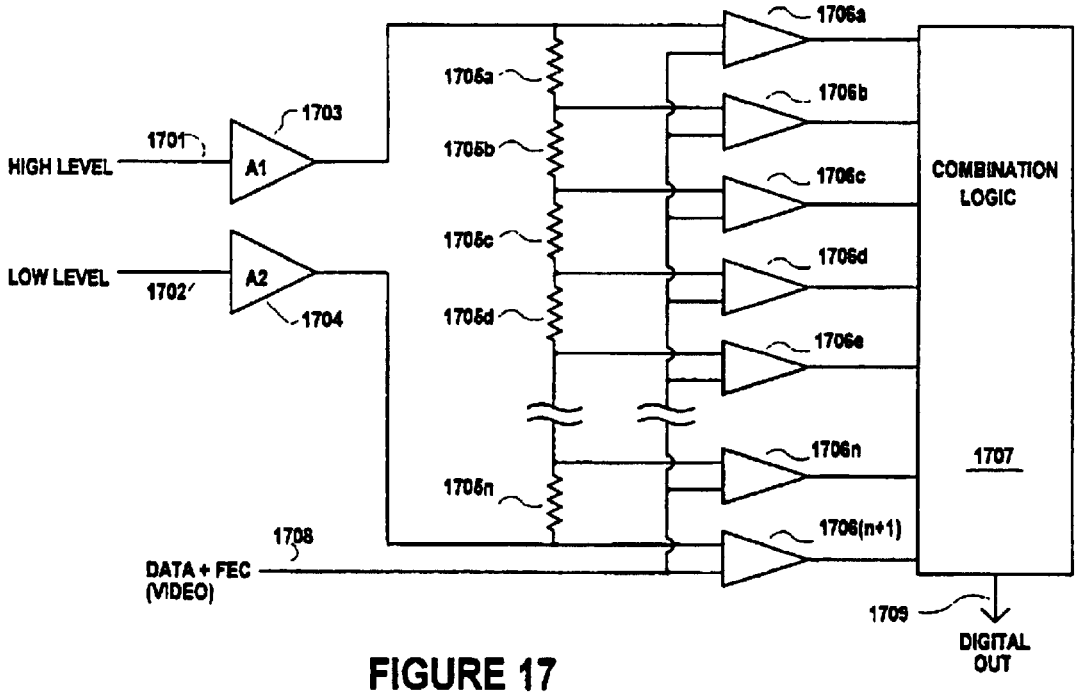
FIG. 17 shows a diagram of the preferred embodiment of the present invention for providing thresholds and slicing data.

In FIG. 17 the high level signal and low level signals from 1611 and 1612 are coupled to the reference level circuit at 1701 and 1702, respectively. These levels are translated to the upper reference level and lower reference level by amplifiers 1703 and 1704 having respective gains A1 and A2. This translation may be appreciated by inspecting FIG. 13 where it can be seen that the upper level needs to be between the upper two data levels corresponding to 14 on the left scale whereas the high level of the sync pulse corresponds to level 9. Correspondingly, the sync tip is at level −9 and the lower reference level should be at −14.

The upper and lower reference levels are then divided into the multiple data reference levels necessary for data slicing by resistors 1705a–n as shown by way of example in FIG. 17. As related to FIG. 13, these reference levels would correspond to 15 values of 14, 12, 10, 8, 6, 4, 2, 0, −2, −4, −6, −8, −10, −12 and −14 on the left scale which values define 16 possible data words. It will be understood that while the operation of FIG. 17 is shown by way of example with respect to voltages and resistances, it may be provided by equivalent use of currents and current ratios as will be known to one of ordinary skill in the art.

Each reference level from the resistor network 1705 is coupled to a comparator 1706 with the data & FEC (Forward Error Correction) portion of the video signal coupled to the other inputs of all of the comparators via 1708. The outputs of the 15 comparators are coupled to the combination logic 1707 which provides a combined digital output 1709 which represents a particular one of 16 words corresponding to the data level of the video at a particular time.

Figure 18:
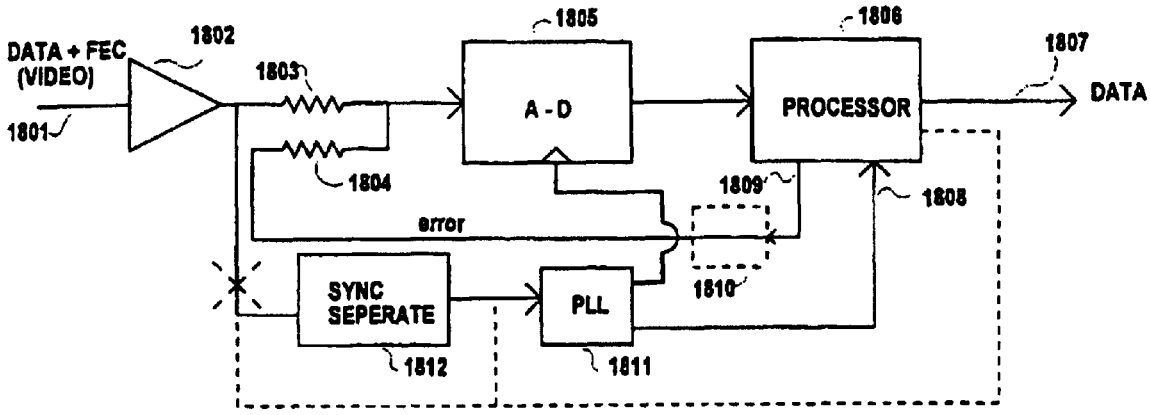
FIG. 18 shows a digital embodiment of the present invention.

FIG. 18 shows a digital embodiment of the present invention. It will be recognized that many of the functions of the present invention may be performed in the digital domain rather than the analog domain which is described in respect to the preferred embodiment. The video is received at 1801, processed by 1802 and coupled from 1802 to a sync separator 1812 which provides a coarse separation of sync, and may be comprised of appropriate portions of FIG. 16. The sync separator provides separator sync pulses to the PLL 1811 which generates clocks for the A-D 1805 and Processor 1806. Alternatively, the clocks may be generated from the data as is well known in the art, in which case 1812 will be replaced with a clock or data extraction circuit.

The processor 1806 may be of a general purpose type, for example a microprocessor which is programmed to perform the steps or equivalent functions described herein via software control, or may be of a more dedicated type such as a DSP IC or dedicated IC designed specifically for the task. All of these embodiments will be known to be of use to one of ordinary skill in the art from the teachings herein.

The video data and FEC from 1802 is coupled to a processing circuit 1802 where it is prepared for coupling to an A-D convertor 1805 via a D.C. restoration circuit comprised of 1803 and 1804 and portions of a processor circuit 1806. The A-D 1805 receives the D.C. restored video and a sampling clock from PLL 1811. The video is digitized by 1805 with the digital video being coupled to the processor 1806.

The processor includes circuitry for sampling the sync blanking levels and sync tip, comparing the level to a reference and generating a correction for providing D.C. offset via connection 1809. Alternatively, the output of the comparison within 1806 may be coupled to an integrator 1810 as previously described.

Processor 1806 further provides establishing thresholds and slicing the data in response to the thresholds as previously described in order to provide the data out 1807 corresponding to 1709 of FIG. 17. The processor may also provide sync separation or data or clock separation as previously described with respect to 1812. Additionally, 1806 may be configured to provide additional functions such as those connected with the utilization of the data.

It will be appreciated that if an A-D convertor having sufficient range is employed, with suitable coupling such as capacitive coupling, that the D.C. restoration may be eliminated and thresholds for slicing may be computed on the fly within processor 1806 in order that the thresholds are dynamically adjusted as data is received in order to accommodate various tilt distortions. In particular, the level of the thresholds may be computed at both ends of a data block and adjusted throughout the data block to facilitate slicing.

As an example, if the data block is 100 clocks long, and a given threshold starts at value 50 units and ends at value 60 units the threshold value may be adjusted upward by 0.1 unit per clock thus causing the threshold to ramp up to track the tilt in the data. Another threshold might start at value 200 units and ends at value 180 units with this threshold value being adjusted downward by 0.2 unit per clock thus causing the threshold to ramp down to track the tilt in the data. This ramping threshold may then also be further finely adjusted in response to the data itself within and even continuously throughout the data block in addition to adjustment just at the ends. Accordingly, all thresholds may be simultaneously adjusted in different amounts and in different patterns. This approach provides not only for handling overall tilt of the data block, but will inherently compensate for any nonlinear distortion since the actual data may be utilized and the thresholds independently adjusted throughout the data block.

As a further example of the usefulness of 1806, the tilt of the data block may be corrected before or as part of the data slicing. As with the previous example where the given threshold starts at value 50 units and ends at value 60 units the data values may be adjusted downward by 0.1 unit per clock thus causing the tilt to be removed from the data in order that a fixed threshold may be used. Combinations of the two approaches may be utilized as well.

Figure 19:
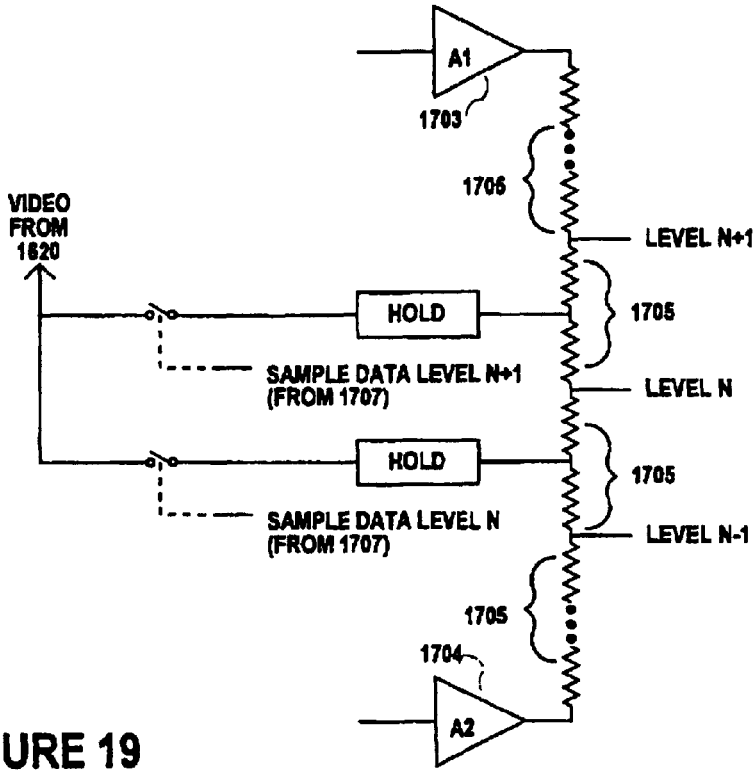
FIG. 19 shows a diagram of the preferred embodiment of the present invention for providing thresholds in response to data.

FIG. 19 shows an analog circuit for providing fine adjustment to the thresholds which are utilized by comparators 1706 of FIG. 17 in response to the data of the video type signal. The high level and low level signals are coupled to 1703 and 1704 to provide the top and bottom levels however each data value of the video from 1620 is sampled as soon as that data level is determined by 1707.

For example, a given data level N is detected as being between two thresholds N and N−1 by 1707, and the sample and hold corresponding to that level is caused to operate to sample and hold the actual data level. This operation continues for all data levels as the corresponding data is received, including for samples of data at levels N+1. It will be seen that by splitting the resistors 1705 corresponding to the thresholds above and below a particular data level, and coupling the actual sampled and held data level to the split resistors, that adjustment of the threshold values immediately above and below may be had. In this fashion, the threshold values may be adjusted to lie precisely in the middle of the data levels. This operation may of course be included in processor 1806 discussed above.

FIG. 20 shows a sync edge detection circuit which may be utilized for 1614 and 1615 of FIG. 16. The video signal having a sync pulse characteristic such as shown by 2002 is coupled to a differential 2001 which outputs pulses shown as 2003 which have an amplitude which is in proportion to the amplitude of the edge of 2002. The pulses are compared to two references which are preferred to be set at 85% of the amplitude of the pulse corresponding to a legitimate sync edge. The comparator, upon receiving a pulse equal to or in excess of the reference outputs a pulse the presence of which indicates a sync edge or possibly a data transition having a magnitude equal to or greater than that of the corresponding reference level. If desired, a second set of comparators may be included which have references of 115% of the amplitude of the pulse corresponding to a legitimate sync edge. The comparator, upon receiving a pulse equal to or in excess of this second reference outputs a pulse the presence of which indicates an edge having too large an amplitude, most likely resulting from a noise pulse or a data transition. This second set of comparators would then be used to inhibit or flag the output of the first set of comparators in order to prevent these invalid edges from being further processed.

One skilled in the art will recognize that the above described functions and components are somewhat more complex than represented by the present block diagrams, however from the disclosure and teachings herein, taken with the available applications literature available from the manufacturers of the suggested components, or from other components which may be substituted as will be known from the above disclosure, the construction of a practical and operable device will be well within the capability of one or ordinary skill in the art without resorting to further invention or undue experimentation.

Figure 21:
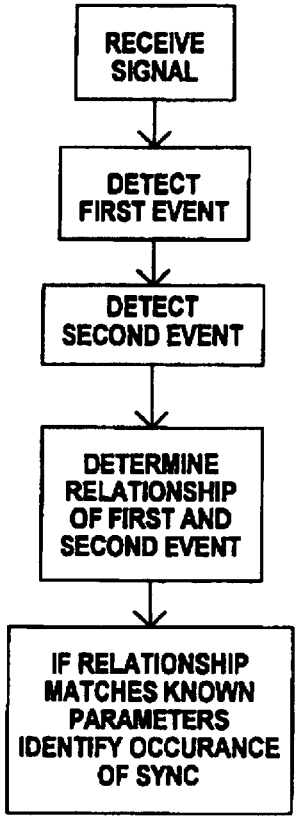
FIG. 21 is a flow chart of a synchronizing signal identifying method in accordance with the present invention.

FIG. 21 is a flow chart of a synchronizing signal identifying method in accordance with the present invention. The video type signal is first received, followed by the detection of a first event and the detection of a second event. The relationship between the first and second event is determined and if the relationship matches known parameters the occurrence of the sync is identified.

It will be understood that the previous descriptions and explanations are given by way of example, and that numerous changes in the combinations of elements and functions as well as changes in design of the above may be made without departing from the spirit and scope of the invention as hereinafter claimed. In particular, will be useful to combine the functions of the invention with other functions in a fashion so that such functions may be shared between devices or methods. These and other modification to and variations upon the embodiments described above are provided for by the present invention, the scope of which is limited only by the following claims.

What is claimed is:

1. A processing apparatus, implemented in analog or digital form or both, for recovering synchronizing information from a video type signal including:

circuitry responsive to said video type signal to provide a first reference taking signal which is responsive to and occurs after a falling sync edge and to further provide at least a second reference taking signal which is responsive to and occurs after a rising sync edge;

circuitry responsive to synchronizing pulses of said video type signal and said first and second reference taking signals to generate at least a first reference level signal in response to said first reference taking signal and a second reference level signal in response to said second reference taking signal, said reference level signals representing different levels of said synchronizing pulses; and circuitry responsive to said synchronizing pulses of said video type signal and a level responding to said reference level signals to generate recovered synchronizing pulses.

2. An apparatus, in analog or digital form or both, for recovering synchronizing information from a video type signal including:

clamping circuitry responsive to said video type signal to provide a clamped signal; circuitry responsive to said clamped signal to provide a plurality of reference taking signals;

circuitry responsive to synchronizing pulses of said video type signal and said plurality of reference taking signals to generate at least a first reference level signal and a second reference level signal, said reference level signals representing different levels of said synchronizing pulses; and circuitry responsive to said synchronizing pulses and a level responding to said reference level signals to generate recovered synchronizing pulses, with said reference taking signals being independent of said level responding to said reference level signals.

3. A video type signal processing apparatus, in analog or digital form or both, for producing logic level sync pulses including:

circuitry for generating a plurality of sampling signals each of which is responsive to an edge of a sync pulse of said video type signal and is delayed with respect to said edge;

circuitry for taking samples of synchronizing pulses of said video type signal and for providing samples of synchronizing pulse levels in response to said plurality of sampling signals, said circuitry for taking samples operable to generate at least a first reference level signal and a second reference level signal, said reference level signals respectively representing said synchronizing pulse levels, and with said sampling signals being independent of said reference level signals; and comparing circuitry operable to compare said synchronizing pulses of said video type signal with a level responding to said reference level signals to generate said logic level sync pulses.

4. A video type signal processing apparatus, implemented in analog or digital form or both, for producing logic level sync pulses including:

clamping circuitry responsive to said video type signal to provide a clamped signal;

circuitry for generating a plurality of sampling signals each of which is responsive to an edge of a sync pulse of said clamped signal and is delayed with respect to said edge;

circuitry for taking samples of synchronizing pulse of said video type signal and for providing samples of synchronizing pulse levels in response to said plurality of sampling signals, said circuitry for taking samples operable to generate at least a first reference level signal and a second reference level signal, said reference level signals respectively representing said synchronizing pulse levels, and with said sampling signals being independent of said reference level signals; and comparing circuitry operable to compare said sync pulses of said video type signal with a level responding to said reference level signals to generate said logic level sync pulses.

5. A video signal processing apparatus, implemented in analog or digital form or both, for use with a video signal having synchronizing pulses including horizontal synchronizing pulses including:

circuitry responsive to said horizontal synchronizing pulses to provide a plurality of reference taking signals;

circuitry responsive to said horizontal synchronizing pulses and said plurality of reference taking signals to provide at least a first reference level signal and a second reference level signal, said reference level signals respectively representing different levels of said horizontal synchronizing pulses; and circuitry for comparing said synchronizing pulses of said video signal with a level responding to said reference level signals to generate logic level pulse versions of said synchronizing pulses, with said reference taking signals being independent of said level responding to said reference level signals.

6. A video type signal processing apparatus, implemented in analog or digital form or both, for producing logic level sync pulses including:

circuitry for generating a plurality of sampling signals;

circuitry for sampling horizontal synchronizing pulses of said video type signal in response to said plurality of sampling signals, said circuitry for sampling operable to generate at least a first reference level signal and a second reference level signal, said reference level signals respectively representing different levels of said horizontal synchronizing pulses; and comparing circuitry operable to compare said horizontal synchronizing pulses of said video type signal with a level responding to said reference level signals to generate said logic level sync pulses with said sampling signals being independent of said level responding to said reference level signals.

7. A method for processing a sync portion of a video type signal, said sync portion having a plurality of levels, comprising steps of:

a) a first separation of said sync portion to generate a first separated sync signal;

b) generating a plurality of level signals each being representative of a level of said sync portion, at least one of which level signals is also generated in response to an edge of said first separated sync signal and is delayed at least 0.1 μs with respect thereto;

c) providing a reference signal in response to said plurality of level signals;

d) a second separation of said sync portion in response to said reference signal to provide a second separated sync signal which is a version of said sync portion.

8. A method as claimed in claim 7 wherein in said step b) includes holding one level of said sync portion at a known value in response to said first separated sync signal, and with step d) performed on said sync portion having one level held.

9. A method of detecting a sync pattern in a video type signal including the steps of:

a) detecting the occurrence of a known first event and generating a marking signal in response thereto;

b) delaying said marking signal by an amount which will provide a delayed version thereof before the expected occurrence of a known second event;

c) detecting an edge of said second event of transition from one state to another;

d) comparing said delayed version of said marking signal and said second event to ensure a proper relationship thereof.

10. The method as claimed in claim 9 including the inspection of a third transition event occurring in said sync pattern relative to said first event to ensure a proper relationship thereto.

11. The method as claimed in claim 9 including the inspection of a third transition event occurring in said sync pattern relative to said second event to ensure a proper relationship thereto.

12. A method of detecting a sync pattern in a video type signal including the steps of:

a) detecting the occurrence of a transition of a known direction and at least a minimum amplitude and generating a marking signal in response thereto;

b) delaying said marking signal by an amount which will provide a delayed version thereof at or before the expected occurrence of a known second event;

c) detecting said second event which includes an edge of transition from one state to another;

d) comparing said delayed version of said marking signal and said second event to ensure a proper relationship thereof.

13. A method of detecting a sync pattern in a video type signal including the steps of:

a) detecting the occurrence of a level of a component of said sync pattern for a known amount and time and generating a marking signal in response thereto;

b) delaying said marking signal by an amount which will provide a delayed version thereof at or before the expected occurrence of a known second event;

c) detecting said second event which includes an edge of transition from one state to another;

d) comparing said delayed version of said marking signal and said second event to ensure a proper relationship thereof.

14. A method of detecting an occurrence of a sync signal of a known pattern including the steps of:

a) detecting a first transition of a known direction and amplitude;

b) delaying an indication of the occurrence of said first transition for a known amount of time;

c) detecting a second transition of a known direction and amplitude;

d) detecting the approximate coincidence of said delayed indication and said second transition.

15. A method for detecting an occurrence of a sync event of a known pattern including the steps of:

a) detecting a first transition of a known direction and amplitude;

b) delaying an indication of the occurrence of said first transition for a known amount of time;

c) detecting a second transition of a known direction and amplitude;

d) detecting the approximate coincidence of said delayed indication and said second transition;

e) checking if said first or second occurrence takes place in an expected relationship to a previous event.

16. A method for detecting an occurrence of a sync event of a known pattern including the steps of:

a) detecting a first transition of a known direction and amplitude;

b) delaying an indication of the occurrence of said first transition for a known amount of time;

c) detecting a second transition of a known direction and amplitude;

d) detecting the approximate coincidence of said delayed indication and said second transition;

e) checking if said first or second occurrence takes place in an expected relationship to a later event.

17. The invention of claim 1, 2, 3, 4, 5, 6, 7, 8, 9, 10, 11, 12, 13, 14, 15 or 16 wherein data reference signals are generated in response to levels of said sync.

18. The invention of claim 1, 2, 3, 4, 5, 6, 7, 8, 9, 10, 11, 12, 13, 14, 15 or 16 wherein data reference signals are generated in response to levels of said sync, and in further response to data of said video type signal.

19. An analog digital or combination apparatus for detecting a sync portion of a video type signal including:

a) circuit for detecting the occurrence of a known polarity transition of a known first event of said sync portion and generating a marking signal in response thereto;

b) delay circuit responsive to said marking signal to provide a wider marking signal before the expected occurrence of a known second event;

c) circuit for detecting said second event defined at least by a known polarity transition of said sync portion defining said second event;

d) circuit for comparing said wider marking signal and said second event to ensure a proper relationship thereof.

20. The apparatus as claimed in claim 19 further including a circuit for inspecting a third transition event of said sync portion relative to said first event to ensure a proper relationship thereto.

21. The apparatus as claimed in claim 19 further including a circuit for inspecting a third transition event of said sync portion relative to said second event to ensure a proper relationship thereto.

22. The method of identifying the occurrence of a sync event in a video type signal including the steps of:

receiving said video type signal;

detecting a known first event in said video type signal;

detecting a known second event in said video type signal;

detecting a known third event in said video type signal;

determining the relationship of said first and said second and said third events, and should said relationship match known parameters identify the occurrence of said sync event.

23. A method for detecting in a video type signal an occurrence of a sync portion having a sync tip and a back porch, including the steps of:

a) clamping said video type signal with a sync tip clamp to provide a clamped signal;

b) low pass filtering said clamped signal to provide a filtered signal;

c) measuring the level of one of said sync tip or said back porch during the time period starting at least 0.1 microsecond after the start of said sync tip or reference level and ending before the end of said sync tip or reference level;

d) in response to said level of c) generating a 50% level signal representative of the midpoint between said sync tip and said back porch;

e) comparing said filtered signal and said 50% level signal to generate a logic level sync signal which is a version of said sync signal;

f) in response to a previous logic level sync signal from step e), generating a window signal representative of the expected occurance of a current logic level sync signal;

g) comparing said window signal to said logic level sync signal output of step e) and passing said logic level sync signal if it occurs within said window signal and blocking said logic level sync signal otherwise.

24. A method as claimed in claim 23 further including:

h) in response to said logic level sync signal of g) providing a horizontal signal having a duration of approximately one half horizontal period;

i) in response to said logic level sync signal of g) providing a vertical sync signal thereof;

j) comparing said horizontal sync signal of h) with the leading edge of said vertical sync signal of i) to generate a signal indicating odd and even fields, which signal changes polarity at the leading edge of said vertical sync signal.

25. An apparatus for detecting in a video type signal the occurrence of a 2 level sync portion having a sync tip and a reference portion, including:

a) circuitry for detecting the presence of a pattern of values representing said sync portion and operative to generate a first signal in response to the occurance thereof, said pattern including said reference portion followed by said sync tip for a known duration followed by said reference portion;

b) a delaying circuit for generating a delayed signal a delay period after said first signal, said delay period being the period until the next expected occurance of said pattern of values as detected by a);

c) a coincidence circuit responsive to the coincidence of said delayed signal and said next occurance of said pattern of values and operative to generate an output signal, which output signal signifies the occurrence of said sync portion, said coincidence circuit further operative to couple said output signal to said delaying circuit b).

26. An apparatus as claimed in claim 25 wherein said video type signal includes digital data which is represented by multiple data levels said apparatus further including:

d) level detecting circuit responsive to said video type signal to determine the level of said sync tip and said reference portion;

e) reference level circuit responsive to said level of sync tip and said reference portion in d) to generate a plurality of data slicing levels;

f) comparison circuit responsive to said video type signal and said plurality of data slicing levels to identify which said data level said video type signal falls into at known times.

27. An apparatus as claimed in claim 26 wherein said level detecting circuit of d) is further responsive to determine the levels of a plurality of said sync tip and a plurality of said reference portion, and said reference level circuit of e) is responsive to d) to change said data slicing levels between successive ones of said sync portions in response to changes in the levels of said sync tip and said reference portion.

28. A method for processing a data portion of a video type signal which includes a sync pulse, said sync pulse having a plurality of levels including a first level which is lower than the highest data level and a second level which is higher than the lowest data level, comprising the steps of:

a) determining the value of said first level;

b) determining the value of said second level;

c) establishing an upper data reference level in response to the value of a);

d) establishing a lower data reference level in response to the value of b);

e) generating a plurality of data slice levels in response to the levels of c) and d);

f) comparing said data portion to said data slice levels of e) to determine which data level said data portion occupies at given instances.

29. The method as claimed in claim 14, 15 or 16 wherein said known amplitude of a) is determined by requiring the amplitude of said first transition to be greater than a minimum value.

30. The method as claimed in claim 14, 15 or 16 wherein said known amplitude of a) is determined by requiring the amplitude of said first transition to be greater than a minimum value and less than a maximum value.

31. The method as claimed in claim 14, 15 or 16 wherein said known amplitude of c) is determined by requiring the amplitude of said second transition to be greater than a minimum value.

32. The method as claimed in claim 14, 15 or 16 wherein said known amplitude of c) is determined by requiring the amplitude of said second transition to be greater than a minimum value and less than a maximum value.

33. The method of recovering sync from a video type signal including the steps of:

a) coupling said video type signal through a capacitor or other circuit thereby establishing a level shifted signal having a sync portion;

b) comparing said level shifted signal to a first known reference to provide a compared signal;

c) selectively adding a current to said level shifted signal wherein the amount and/or polarity of said current is responsive to said compared signal and the D.C. level of said level shifted signal is changed in response to said current;

d) comparing said level shifted signal to a second known reference to provide a second compared signal, which second compared signal is a logic level representation of said sync portion.

34. The method as recited in claim 33 wherein in step c) said sync portion is clamped to a known D.C. level thus providing sync tip clamping of said level shifted signal.

35. The method as recited in claim 33 wherein in step c) a first substantially constant current is taken from said level shifted signal and a second current is added to said level shifted signal through a diode in response to said compared signal being at a known level, said step c) thereby clamping the tip of said sync portion to a known D.C. level.

36. The method as recited in claim 33, 34 or 35 wherein in step d) said second known reference is established at substantially the 50% level of said sync portion.

37. The method as recited in claim 33, 34 or 35 wherein step d) includes measuring at least one of the highest or lowest level of said sync portion as part of establishing said second known reference.

38. The method as recited in claim 33, 34 or 35 wherein step d) includes measuring the highest and lowest level of said sync portion as part of establishing said second known reference.

39. The method as recited in claim 33, 34 or 35 including the further steps:

e) in response to said second compared signal of d), generating an adjustable window signal;

f) comparing said second compared signal of d) to said window signal and selectively passing or blocking said second compared signal in response thereto;

g) adjusting said window signal of e) in response to the expected format of said video type signal.

40. The method of detecting a sync segment of a video type signal which may be an HDTV signal including the steps of:

a) responding to sync pulses by inspecting said video type signal for the occurrence of a first transition in a known direction between a plurality of levels of known amounts followed at a known time by a second transition in a known direction between said plurality of levels and providing a sync signal in response thereto;

b) delaying said sync signal for a period corresponding to the expected period until the next arriving one of said sync pulses satisfying step a) thereby providing a delayed sync signal;

c) inspecting said delayed sync signal of step b) and a next arriving sync signal from step a) and in response to the substantial coincidence thereof providing a segment signal indicating the arrival of said sync segment.

41. The method of providing an output segment signal indicating the presence of sync segments of a video type signal which may be an HDTV signal including the steps of:

a) delaying said output segment signal for a period corresponding to the expected period between said sync segments, thereby providing a delayed signal having delayed indications of said sync segments;

b) inspecting said video type signal for the occurrence of a first transition in a known direction between a plurality of known levels followed a known time later by a second transition in a known direction between said plurality of levels and providing a sync signal having current indications of each said occurrence;

c) responding to said delayed signal of step a) and said sync signal of step b) in response to the coincidence of said delayed indication and said current indication to provide said output segment signal.

42. The method of claim 41 including the additional steps of;

d) detecting the loss of said delayed or current indications;

e) altering step c) to provide said output segment signal upon occurrence of said sync signal of b) without consideration of said coincidence.

43. The method of claim 41 including the additional steps of;

d) detecting a latch up condition in step c said condition preventing said coincidence;

e) altering step c) to provide said output segment signal upon occurrence of said sync signal of b).

44. The method as claimed in claim 40, 41, 42 or 43 including the further steps of:

f) sampling said video type signal after said first transition and before said second transition;

g) in response to step f), establishing a plurality of threshold levels;

h) periodically outputting a digital number representative of the amplitude of said video signal with respect to said threshold levels.

45. The method as claimed in claim 40, 41, 42 or 43 including the further steps of:

f) sampling said video type signal after said first transition and before said second transition;

g) sampling said video type signal either before said first transition or after said second transition;

h) in response to steps f) and g), establishing a plurality of threshold levels;

i) inspecting said video signal with respect to said plurality of threshold levels of step h) and periodically outputting a digital number representative of the amplitude of said video signal with respect to said threshold levels.

*46. The processing apparatus of claim 1, comprising:*

*circuitry to clamp the video type signal,*

*wherein the clamp circuitry is configured to use a current, the current having a variable amount and capable of changing polarity.*

*47. The apparatus of claim 2, wherein clamping circuitry is configured to utilize a current, and*

*wherein the current is variable in amount and capable of changing polarity.*

*48. The video type signal processing apparatus of claim 3, comprising:*

*circuitry for clamping the video type signal,*

*wherein the clamping circuitry is configured to use a current, the current having a variable amount and capable of changing polarity.*

*49. The video type signal processing apparatus of claim 4, wherein the clamping circuitry is configured to utilize a current, and*

*wherein the current is variable in amount and capable of changing polarity.*

*50. The video signal processing apparatus of claim 5, comprising:*

*circuitry for clamping the video signal,*

*wherein the clamping circuitry is configured to use a current, the current having a variable amount and capable of changing polarity.*

*51. The video type signal processing apparatus of claim 6, comprising:*

*circuitry for clamping the video type signal,*

*wherein the clamping circuitry is configured to use a current, the current having a variable amount and capable of changing polarity.*

*52. The method of claim 7, wherein step (a) utilizes clamping including a current, and*

*wherein the current is variable and capable of changing polarity.*

*53. The method of claim 23, wherein the sync tip clamp utilizes a current, the current having a variable amount and capable of changing polarity.*

*54. The method of claim 33, wherein in step (c), the amount and polarity of said current is responsive to said compared signal.*

*55. The method of claim 33, wherein in step (c), one of the amount and polarity of said current is responsive to said compared signal.*

*56. The method of claim 33, wherein in step (a), said video type signal is coupled through a capacitor.*

*57. The method of claim 33, wherein in step (a), said video type signal is coupled through an other circuit.*

*58. The method of claim 57, wherein the other circuit comprises at least one resistor.*

*59. The method of claim 33, wherein the video type signal comprises horizontal sync and half horizontal pulses,*

*wherein the second compared signal is a logic level representation of the sync portion that includes the horizontal sync and half horizontal pulses, and*

*wherein the method includes the steps of:*

*e.) setting a timing current by selecting a component value in accordance with the video type signal being standard definition or high definition; and*

*f.) removing the half horizontal pulses in response to the timing current and the logic level representation of the sync portion.*

*60. The method of claim 59, wherein in step (c) the sync portion is clamped to a known D.C. level to provide sync tip clamping of the level shifted signal.*

*61. The method of claim 59, wherein in step (c) a first substantially constant current is taken from the level shifted signal and a second current is added to the level shifted signal through a diode in response to the compared signal being at a known level, and*

*wherein step (c) clamps the tip of the sync portion to a known D.C. level.*

*62. The method of claim 59, wherein in step (d) the second known reference is established at substantially 50% level of the sync portion.*

*63. The method of claim 59 wherein step (d) includes measuring at least one of the highest or the lowest level of the sync portion to establish the second known reference.*

*64. The method of claim 59, wherein step (d) includes measuring the highest and the lowest level of the sync portion to establish the second known reference.*

*65. The method of claim 33, wherein the video type signal comprises horizontal sync and half horizontal pulses,*

*wherein the second compared signal is a logic level representation of the sync portion that includes the horizontal sync and half horizontal pulses, and*

*wherein the method includes the steps of:*

*e.) setting a timing current by selecting a component value,*

*wherein the selection is dependent on the video type signal being standard definition with two level sync or high definition with three level sync; and*

*f.) removing the half horizontal pulses in response to the timing current and the logic level representation of the sync portion thereby providing the horizontal sync.*

*66. The method of claim 65, wherein in step (c) the sync portion is clamped to a known D.C. level to provide sync tip clamping of the level shifted signal.*

*67. The method of claim 65, wherein in step (c) a first substantially constant current is taken from the level shifted signal and a second current is added to the level shifted signal through a diode in response to the compared signal being at a known level, and*

*wherein step (c) clamps the tip of the sync portion to a known D.C. level.*

*68. The method of claim 65, wherein in step (d) the second known reference is established at substantially a 50% level of the sync portion.*

*69. The method of claim 65 wherein step (d) includes measuring at least one of the highest or the lowest level of the sync portion to establish the second known reference.*

*70. The method of claim 65, wherein step (d) includes measuring the highest and the lowest level of the sync portion to establish the second known reference.*

*71. The method of claim 65, wherein the selecting of step (e) is in response to automatic detection of the format of the video type signal.*

*72. The method of claim 65, wherein the selecting of step (e) is accomplished by manual selection of the component value.*

*73. The method of claim 33, wherein a blanking voltage is obtained by responding to and holding a voltage level of a blanking, and*

*wherein the second known reference is established by coupling the held blanking voltage to an end of a resistor divider.*

*74. The method of claim 33, wherein a sync tip voltage is obtained by responding to and holding a voltage level of a sync tip, and*

*wherein the second known reference is established by applying the held sync tip voltage to an end of a resistor divider.*

*75. The method of claim 33, wherein a blanking voltage is obtained by responding to and holding a voltage level of a blanking,*

*wherein a sync tip voltage is obtained by responding to and holding a voltage level of a sync tip, and*

*wherein the second known reference is established by coupling the held sync tip voltage to a first end of a resistor divider and coupling the held blanking voltage to a second end of the resistor divider.*

*76. A method of recovering sync from a video type signal, comprising the steps of:*

*a.) coupling the video type signal through a capacitor or other circuit to establish a level shifted signal having a sync portion;*

*b.) comparing the level shifted signal to a first known reference to provide a compared signal;*

*c.) selectively adding a current to the level shifted signal,*

*wherein at least one of the amount and the polarity of the current is responsive to the compared signal, and*

*wherein a D.C. level of the level shifted signal is changed in response to the current;*

*d.) automatically detecting the presence of standard definition with two level or high definition with three level sync of the video type signal;*

*e.) in response to step (d), establishing a second known reference that changes in response to the number of levels of the sync portion; and*

*f.) comparing the level shifted signal to the second known reference to provide a second compared signal,*

*wherein the second compared signal comprises a logic level representation of the sync portion.*

*77. The method of claim 76, wherein the second known reference is maintained at substantially a 50% level of the sync portion in response to the amplitude of the sync portion.*

*78. A method of recovering sync from a video type signal, comprising the steps of:*

*a.) coupling the video type signal through a capacitor or other circuit to establish a level shifted signal having a sync portion;*

*b.) comparing the level shifted signal to a first known reference to provide a compared signal;*

*c.) selectively adding a current to the level shifted signal,*

*wherein at least one of the amount and the polarity of the current is responsive to the compared signal, and*

*wherein a D.C. level of the level shifted signal is changed in response to the current;*

*d.) establishing a second known reference that changes in response to the amplitude of the sync portion; and*

*e.) comparing the level shifted signal to the second known reference to provide a second compared signal,*

*wherein the second compared signal comprises a logic level representation of the sync portion.*

*79. The method of claim 78, wherein the second known reference is maintained at substantially a 50% level of the sync portion in response to the amplitude of the sync portion.*

*80. A method of recovering sync from a video type signal, comprising the steps of:*

*a.) coupling the video type signal through a capacitor or other circuit to establish a level shifted signal having a sync portion;*

*b.) comparing the level shifted signal to a first known reference to provide a compared signal;*

*c.) selectively adding a current to the level shifted signal,*

*wherein at least one of the amount and the polarity of the current is responsive to the compared signal, and*

*wherein a D.C. level of the level shifted signal is changed in response to the current;*

*d.) establishing a second known reference that changes level in response to the amplitude and number of levels of the sync portion; and*

*e.) comparing the level shifted signal to the second known reference to provide a second compared signal,*

*wherein the second compared signal comprises a logic level representation of the sync portion.*

*81. The method of claim 80, wherein the second known reference is maintained at substantially a 50% level of the sync portion in response to the amplitude of the sync portion.*

*82. A method of recovering sync from a video type signal, comprising the steps of:*

*a.) coupling the video type signal through a capacitor to establish a level shifted signal comprising a sync portion with sync tip and blanking levels;*

*b.) comparing the level shifted signal to a first known reference with a differential amplifier to provide a compared signal at the output thereof;*

*c.) selectively adding a current to the level shifted signal, wherein the amount of the current is responsive to the compared signal, and*

*wherein a D.C. level of the level shifted signal is changed in response to the current;*

*d.) responding to and holding one of the sync tip or blanking level of the sync portion to provide a first level signal;*

*e) in response to the first level signal, providing at least a second known reference that has a value substantially midway between sync tip and blanking levels; and*

*f.) comparing the level shifted signal to the second known reference to provide a second compared signal,*

*wherein the second compared signal comprises a logic level representation of the sync portion.*

*83. The method of claim 82, wherein step (d) includes the step of:*

*g.) responding to and holding both the sync tip and blanking levels of the level shifted signal to provide the first level signal and a second level signal; and*

*wherein step (e) is responsive to both the first level signal and the second level signal to provide the second known reference.*

*84. The method of claim 82, wherein in step (e) a third known reference is provided in response to the first level signal.*

*85. The method of claim 84, wherein in step (e) the third known reference comprises a level between the second known reference and one of the sync tip and blanking levels.*

*86. The method of claim 84, wherein in step (e) the third known reference comprises a level signal having a level between the second known reference and the sync tip level.*

*87. The method of claim 84, wherein in step (e) the third known reference comprises a level signal having a level between the second known reference and blanking level.*

*88. The method of claim 84, wherein in step (e) the third known reference comprises a level between the second known reference and the sync tip level, and*

*wherein a fourth known reference comprises a level between the second known reference and blanking level.*

* * * * *